US008478481B2

(12) United States Patent
Igarashi et al.

(10) Patent No.: US 8,478,481 B2
(45) Date of Patent: Jul. 2, 2013

(54) FUEL-SAVING MANAGEMENT SYSTEM

(75) Inventors: Hajime Igarashi, Hino (JP); Kenji Shimizu, Hino (JP); Hideki Tajika, Hino (JP)

(73) Assignee: Hino Motors, Ltd., Tokyo (JP)

( * ) Notice: Subject to any disclaimer, the term of this patent is extended or adjusted under 35 U.S.C. 154(b) by 679 days.

(21) Appl. No.: 10/595,904

(22) PCT Filed: Nov. 17, 2004

(86) PCT No.: PCT/JP2004/017055
§ 371 (c)(1),
(2), (4) Date: May 18, 2006

(87) PCT Pub. No.: WO2005/049992
PCT Pub. Date: Jun. 2, 2005

(65) Prior Publication Data

US 2007/0213920 A1 Sep. 13, 2007

(30) Foreign Application Priority Data

Nov. 18, 2003 (JP) ................................ 2003-387323
Nov. 18, 2003 (JP) ................................ 2003-387325
Nov. 18, 2003 (JP) ................................ 2003-387327
Apr. 30, 2004 (JP) ................................ 2004-135204
Apr. 30, 2004 (JP) ................................ 2004-135211
Apr. 30, 2004 (JP) ................................ 2004-135215

(51) Int. Cl.
*B60R 16/00* (2006.01)
*B60K 31/18* (2006.01)
*G06F 19/00* (2011.01)
*F02D 29/00* (2006.01)

(52) U.S. Cl.
USPC ....... 701/33.6; 701/33.4; 701/33.7; 701/33.9; 701/123

(58) Field of Classification Search
USPC ............... 701/114, 33.4, 33.6, 33.7, 33.9, 70, 701/99, 123
See application file for complete search history.

(56) References Cited

U.S. PATENT DOCUMENTS 3,889,647 A * 6/1975 Rachel .......................... 123/353
4,463,427 A * 7/1984 Bonnetain et al. ............ 701/123
4,506,752 A * 3/1985 Hara et al. .................... 180/179
4,594,979 A 6/1986 Yasuhara et al.

(Continued)

FOREIGN PATENT DOCUMENTS

JP 59-119494 7/1984
JP 60-12636 1/1985

(Continued)

*Primary Examiner* — Khoi Tran
*Assistant Examiner* — Dale Moyer
(74) *Attorney, Agent, or Firm* — Greenblum & Berstein, P.L.C.

(57) ABSTRACT

A fuel-saving management system allowing fuel-saving management and associated driver assistance. The system includes, mounted on a vehicle, information detectors detecting various information on the driving state of the vehicle, an information processor, in addition to processing the information detected by the information detectors, generating a warning when processed information satisfies required warning conditions, and an information storage device storing the processed information. In this system, when either a time during which the processed information is maintained to satisfy the required warning conditions, or an elapsed time of the processed information exceeds a previously set time, the information processor stores the occurrence of this overtime event into the information storage device. A setter allowing modification of the required warning conditions, and a printer outputting the information relating to the processed information are also mounted.

2 Claims, 21 Drawing Sheets

U.S. PATENT DOCUMENTS

| | | | | | |
|---|---|---|---|---|---|
| 4,843,575 | A | | 6/1989 | Crane | |
| 5,019,799 | A | * | 5/1991 | Oshiage et al. | 340/438 |
| 5,230,318 | A | * | 7/1993 | Iwamoto | 123/478 |
| 5,259,355 | A | * | 11/1993 | Nakashima et al. | 123/520 |
| 5,754,965 | A | * | 5/1998 | Hagenbuch | 701/35 |
| 5,763,764 | A | * | 6/1998 | Mieczkowski et al. | 73/40 |
| 6,052,644 | A | * | 4/2000 | Murakami et al. | 701/93 |
| 6,092,021 | A | * | 7/2000 | Ehlbeck et al. | 701/123 |
| 6,472,982 | B2 | | 10/2002 | Eida et al. | |
| 2002/0063637 | A1 | | 5/2002 | Eida et al. | |
| 2002/0161495 | A1 | * | 10/2002 | Yamaki | 701/33 |

FOREIGN PATENT DOCUMENTS

| | | | |
|---|---|---|---|
| JP | 6012636 | | 1/1985 |
| JP | 60091270 | | 5/1985 |
| JP | 60093174 | | 5/1985 |
| JP | 60145440 | | 7/1985 |
| JP | 63-38034 | | 3/1988 |
| JP | 63055354 | | 3/1988 |
| JP | 63163590 | | 7/1988 |
| JP | 1992-110924 | | 9/1992 |
| JP | 4-366729 | | 12/1992 |
| JP | 10-069555 | | 3/1998 |
| JP | 10-069555 | A | 3/1998 |
| JP | 2000-087776 | | 3/2000 |
| JP | 2001-082243 | | 3/2001 |
| JP | 2001-289110 | | 10/2001 |
| JP | 2001-342877 | | 12/2001 |
| JP | 2002-166803 | A | 6/2002 |
| JP | 2002-362185 | | 12/2002 |
| JP | 2002-364400 | | 12/2002 |
| JP | 2003-040054 | | 2/2003 |
| JP | 2003-106182 | | 4/2003 |
| JP | 2003-106207 | | 4/2003 |
| JP | 2003-115065 | | 4/2003 |
| JP | 2003-115065 | A | 4/2003 |

* cited by examiner

FUEL-SAVING MANAGEMENT SYSTEM

CROSS-REFERENCE TO RELATED APPLICATIONS

This is a U.S. national phase application under 35 U.S.C. §371 of International Patent Application No. PCT/JP04/17055 filed Nov. 17, 2004 and claims the benefit of Japanese Applications Nos. 2004-135211, 2004-135204 and 2004-135215, all filed on Apr. 30, 2004, and Japanese Application Nos. 2003-387327, 2003-387325 and 2003-387323, all filed Nov. 18, 2003. The International Application was published in the Japanese language on Jun. 2, 2005 as International Publication No. WO 2005/049992 under PCT Article 21(2).

TECHNICAL FIELD

The present invention relates to a fuel-saving management system suitable for use in motor vehicles such as trucks.

BACKGROUND ART

Conventional fuel-saving management systems for use in, for example, trucks or other motor vehicles, would be broadly divisible into two major types. In one type, a vehicle-mounted analyzer stores vehicle speed, engine speed, fuel flow rate, and other data into a memory in accordance with signals from various sensors. After the end of driving, the driver, the vehicle travel supervisor, or the like further stores the memory-stored data onto a storage medium such as a memory card. The driving data, after being stored onto the storage medium such as a memory card, is input to a vehicle owner/user company's data analyzer provided at the vehicle owner/user company or the manufacturer of the vehicle, and the driving state of the vehicle is analyzed in detail using the data.

The vehicle travel supervisor checks the detailed analyses against previously set warning values of the vehicle speed, engine speed, fuel flow rate, and the like. Thus, the vehicle travel supervisor can obtain information on the way the driver usually drives, and the driver can know his/her own driving state by objective data analyses and thus makes endeavors to drive more safely and more economically (refer to Patent Documents 1 and 2). This conventional type of system, however, has a problem in that since the introduction of the vehicle owner/user company's data analyzer requires a great deal of cost, the system is difficult for small-scale enterprises to adopt.

The other conventional type of fuel-saving management system is, so to speak, a simplified fuel-saving management system. In this conventional type of system, a vehicle-mounted analyzer monitors vehicle speed, engine speed, and other factors, and if the respective predetermined warning values are exceeded, the analyzer warns the driver by a buzzer or a dummy voice (hereinafter, also referred to as a buzzer or the like). Therefore, the driver can immediately know his/her own driving state in the form of a warning and immediately correct the way he/she is driving.

Also, if the predetermined warning values are exceeded, the occurrence time of that event and the count of the warnings issued at up to that time are stored into a memory. In addition, when necessary, the appropriate vehicle travel supervisor can know the occurrence time and the count of the past warnings via a vehicle owner/user company's data analyzer provided at the vehicle owner/user company or the manufacturer of the vehicle, thus manage fuel saving, and provide associated assistance to the driver in a certain range (refer to Patent Documents 3 and 4). Furthermore, this conventional type of simplified fuel-saving management system can also be constructed only of a vehicle-mounted analyzer, and is low enough in cost, even for small-scale enterprises to adopt, and has much in anticipation in terms of future progress.

Patent Document 1: Japanese Patent Laid-open No. H10-069555

Patent Document 2: Japanese Patent Laid-open No. 2003-115065

Patent Document 3: Japanese Utility Model Laid-open No. H04-110924

Patent Document 4: Japanese Patent Laid-open No. 2000-087776

DISCLOSURE OF THE INVENTION

Problems to be Solved by the Invention

In the conventional fuel-saving management systems described above, the driver can immediately know his/her own driving state in the form of a warning based on a buzzer or the like, whereas, in case of the predetermined warning values being exceeded, the vehicle-mounted analyzer stores the occurrence time of that event and the count of the warnings issued at up to that time. The analyzer also reports the occurrence of these warning events to the vehicle travel supervisor when necessary. For these reasons, the occurrence of the particular warning is directly reported to the vehicle travel supervisor too rapidly for the driver to become able to immediately correct his/her own driving state. Such rapid reporting causes the problem that a very significant increase in the mental burden on the driver supervised prevents fuel-saving management and associated assistance to the driver from being conducted smoothly.

In addition, in one of the above conventional types of fuel-saving management systems, the vehicle-mounted analyzer monitors the vehicle speed, the engine speed, and other factors, and if the respective predetermined warning values are exceeded, the analyzer warns the driver by a buzzer or the like. Before the settings of these predetermined warning values can be modified, however, either the vehicle-mounted analyzer must be removed from the vehicle temporarily and then sent to the vehicle owner/user company or the vehicle manufacturer or the above settings within the vehicle-mounted analyzer must be modified via the memory card onto which the predetermined warning values were stored beforehand. There is, therefore, a problem in that since the settings of these warning values stored within the vehicle-mounted analyzer cannot be modified rapidly or easily, fuel-saving management and associated assistance to the driver cannot be conducted smoothly.

In the other conventional type of fuel-saving management system described above, after the end of driving, the memory-stored vehicle speed and other data are analyzed using the procedure below. First, the driver, the vehicle travel supervisor, or the like further stores the memory-stored data onto the storage medium such as a memory card. Next, the driving data that has thus been stored onto the storage medium such as a memory card is input to the vehicle owner/user company's data analyzer at the vehicle owner/user company or the vehicle manufacturer, and the driving state of the vehicle is analyzed in detail using the data. Accordingly, it requires a certain number of days for detailed data analytical results to become available to the driver and the vehicle travel supervisor. This makes it impossible for the driver and the vehicle travel supervisor to view the data analyses during or immediately after driving, causes a delay in understanding of the driving state, and thus poses a problem in that fuel-saving management based on checking against actual driving, and associated assistance to the driver are difficult to achieve.

Furthermore, one of the above conventional types of fuel-saving management systems has a problem in that whereas the driver can immediately know his/her driving state in the form of a warning based on a buzzer or the like, subsequent analysis by the vehicle owner/user company's data analyzer at the vehicle owner/user company or the vehicle manufacturer must be awaited all the same to obtain detailed information on, for example, how often such overlimit driving was repeated. Moreover, there is a problem in that because of its large introduction and running costs, the vehicle owner/user company's data analyzer is difficult for small-scale enterprises to adopt.

Easing up on or releasing the accelerator pedal of the vehicle during driving and using an engine brake in a minimum fuel injection state to slow down the vehicle and extend its decelerated driving distance as long as possible is correspondingly contributive to reduced fuel consumption. However, for vehicles with an auxiliary brake represented by an exhaust brake, a retarder, or the like, since excellent braking characteristics can be easily be obtained by applying the auxiliary brake, there is a tendency to repeat abrupt deceleration and abrupt acceleration coupled therewith, and reduction in fuel efficiency is caused primarily by the repetition of these operations.

Despite the above situation, in the conventional types of fuel-saving management systems described above, logical setting for appropriately monitoring decelerated operation based on an engine brake is not conducted particularly in a vehicle with the above auxiliary brake. In this sense, the fuel-saving management systems have a further problem in that the systems lack one of the most important factors.

The present invention has been made in order to solve these problems, and an object of the invention is to provide a fuel-saving management system that allows fuel-saving management and associated driver assistance to be conducted very smoothly. More specifically, the invention is intended to provide: a fuel-saving management system capable of reducing a mental burden of a driver against a warning; a fuel-saving management system that allows rapid and easy modification of settings of required warning conditions relating to vehicle speed and other predetermined warning values stored in a vehicle-mounted analyzer; a fuel-saving management system that even small-scale enterprises can introduce into respective business establishments even more easily and makes it possible for a driver and/or a vehicle travel supervisor to immediately and accurately know a driving state of a vehicle at a particular time thereon, and for the driver's awareness of the importance of fuel saving to be further improved, as well as for a succession of fuel-saving management activities up to analysis to be executable, even with a vehicle-mounted analyzer alone; or a fuel-saving management system that can appropriately monitor decelerated operation based on an engine brake, especially in a vehicle having an auxiliary brake, and thus improve fuel efficiency management remarkably in accuracy.

Means for Solving the Problems

A fuel-saving management system of the present invention for solving the above-described problems includes the following means mounted on a vehicle: information detection means for detecting information on a driving state of the vehicle, information-processing means for, in addition to processing the information detected by the information detection means, generating a warning when the information processed satisfies required warning conditions, and information storage means for storing the processed information. In this system configuration, when either a time during which the processed information is maintained to satisfy the required warning conditions, or an elapsed time of the processed information exceeds a previously set time, the information-processing means stores the occurrence of this overtime event into the information storage means.

In this way, the occurrence of the warning is not stored into the information storage means simultaneously with the occurrence of that warning. Instead, after the warning has been given to a driver, if such driving that satisfies the required warning conditions is continued in excess of the previously set time, the occurrence of this overtime event is stored into the information storage means. An opportunity for the driver to correct his/her own driving state without feeling a mental burden can thus be provided.

Another fuel-saving management system of the present invention for solving the above-described problems includes the following means mounted on a vehicle: information detection means for detecting information on a driving state of the vehicle, and information-processing means for, in addition to processing the information that the information detection means has detected, generating a warning when the information that has thus been processed satisfies required warning conditions. In this configuration, the system further includes a setter that allows modification of the required warning conditions, the setter also being mounted on the vehicle.

Since the setter allowing the modification of the required warning conditions is equipped on the vehicle, when settings of the required warning conditions in the fuel-saving management system are to be modified, there is no need to remove a vehicle-mounted analyzer from the vehicle temporarily for the above modification and send this analyzer to an owner/user company of the vehicle or a manufacturer thereof. The same also holds true for modifying the settings of the required warning conditions within the vehicle-mounted analyzer via a memory card onto which the warning conditions were stored in advance.

Yet another fuel-saving management system of the present invention for solving the above-described problems includes the following means mounted on a vehicle: information detection means for detecting information on, a driving state of the vehicle, information-processing means for, in addition to processing the information that the information detection means has detected, generating a warning when the information that has thus been processed satisfies required warning conditions, and information storage means for storing the processed information. In this configuration, the system further includes a setter mounted on the vehicle, and in this system configuration having the setter, when either a time during which the processed information is maintained to satisfy the required warning conditions, or an elapsed time of the processed information exceeds a previously set time, the information-processing means stores the occurrence of this overtime event into the information storage means, and the setter allows modification of the required warning conditions and/or the previously set time. Thus, the above two operational effects can be obtained and fuel-saving management and associated assistance to the driver can be conducted more smoothly.

In the above fuel-saving management systems, information on the driving state of the vehicle desirably includes an accelerator angle. The accelerator angle affects fuel consumption in the vehicle significantly. Obtaining accelerator angle information, therefore, renders the information usable for various aspects of fuel-saving management.

In the above fuel-saving management systems, processed information, further desirably, includes the accelerator angle and/or accelerator angle variations per unit time. Adequate fuel-saving management can be conducted by issuing a warning to the driver, based on the accelerator angle and on the accelerator angle variations that affect fuel consumption, particularly during driving on highways or expressways, or by storing the occurrence of an overlimit warning into the information storage means.

In these fuel-saving management systems, the vehicle, further desirably, has a speed limiter capable of adjusting automatically the vehicle speed to a required value or less, and the information-processing means generates a warning on the accelerator angle when the speed limiter is not in operation. During the operation of the speed limiter, even if the angle of the accelerator pedal which the driver steps on becomes too large, the speed limiter prevents a fuel injection rate from exceeding a value commensurate with the required speed. The accelerator angle warning to the driver can therefore be generated when the speed limiter is not in operation. Thus, the sense of discomfort that may be given to the driver can be excluded by avoiding unnecessary warning.

In the above fuel-saving management systems, processed information desirably includes processed information on general roads and processed information on highways or expressways. For example, during driving on a highway or an expressway, if the driver cannot maintain an appropriate distance to the vehicle front, he/she may repeat hastening to slow down and then speed up again in order to catch up with the preceding vehicle. Driving in this fashion not only poses safety-associated problems, but also forms one of the main causes of fuel efficiency deterioration, particularly during driving on highways or expressways. In this way, fuel-saving management has its viewpoint differing between driving on general roads and driving on highways/expressways, and this difference, in turn, causes a difference in the type of information required for fuel efficiency analysis. Accordingly, fuel-saving management can be conducted even more appropriately by enabling independent modification of the settings of the required warning conditions for general-road driving information and highway/expressway driving information each or by storing the occurrence of, for example, an overlimit warning into the information storage means.

In these fuel-saving management systems, the general-road driving information processed is, further desirably, either vehicle speed, engine speed, an accelerator angle, an elapsed idling time, or a combination of any two or more of the four factors. The information-processing means can conduct adequate general-road driving warning (or the like) based on the above information processed.

In these fuel-saving management systems, the information-processing means, further desirably, detects a fuel flow rate as information relating to the driving state of the vehicle, and when the fuel flow rate exceeds a previously set value, conducts warning on the above engine speed. During engine braking, even if the engine speed increases and satisfies the required warning conditions, since the engine itself is in a minimum fuel injection state, fuel efficiency does not deteriorate. Therefore, there is no need to give a warning or the like to the driver in such a case, and the sense of discomfort that may be given to the driver can be excluded by avoiding unnecessary warning.

In the above fuel-saving management systems, the highway/expressway driving information processed is, further desirably, either a vehicle speed, accelerator angle changes, vehicle speed changes, an elapsed top-gear non-operation elapsed time, an auxiliary-brake usage ratio, or a combination of any two or more of the five factors. The information-processing means can conduct adequate highway/expressway driving warning (or the like) based on the above information processed.

In these fuel-saving management systems, the information-processing means, further desirably, detects an accelerator angle as information relating to the driving state of the vehicle, and when the accelerator angle exceeds a previously set value, conducts warning on the above vehicle speed. For example, during downslope driving on highways/expressways, even if the vehicle speed increases according to a particular gradient of the downslope and satisfies the required warning conditions, when the accelerator angle is too small, fuel efficiency does not deteriorate since an actual fuel injection rate is sufficiently low. There is no need, therefore, to give a warning or the like to the driver in such a case, and the sense of discomfort that may be given to the driver can be excluded by avoiding unnecessary warning.

In the above fuel-saving management systems, it is desirable that the information-processing means be capable of selecting whether a warning is to be generated, that the setter be adapted to enable the information-processing means to make this selection, and that when the selection is enabled by the setter, the information-processing means be capable of selecting non-generation of the warning. In some specific states of the vehicle, it is also necessary to enable the driver to select non-generation of the warning. If the driver cannot freely make the selection, however, appropriate fuel-saving management is likely to be inexecutable. Prohibiting the driver from selecting the generation of the warning until the setter has enabled the above selection, therefore, makes it possible to exclude the likelihood of inexecutableness.

Still another fuel-saving management system of the present invention for solving the above-described problems includes the following means mounted on a vehicle: information detection means for detecting information on a driving state of the vehicle, information-processing means for processing the information, and information storage means for storing the information that the information-processing means has processed. In this configuration, the system further includes a printer mounted on the vehicle, the printer being able to output the information relating to the processed information stored within the information storage means.

This printer mounted on the vehicle allows a driver thereof and a travel supervisor of the vehicle to know a particular driving state thereon immediately and accurately in printout form. In addition, successive management activities up to analysis can be conducted, even with a vehicle-mounted analyzer alone, and the vehicle-mounted analyzer requiring large costs for equipment introduction and operation can be made unnecessary.

In this fuel-saving management system, when the processed information mentioned above satisfies required warning conditions, the information-processing means can desirably generate a warning. Also, when either a time during which the processed information is maintained to satisfy the required warning conditions, or an elapsed time of the processing information exceeds a previously set time, the information-processing means can desirably store the occurrence of this overtime event into the information storage means. In addition, the printer can desirably output information on the occurrence of the above warning or the occurrence of the above overtime event.

The occurrence of the warning is not stored into the information storage means simultaneously with the occurrence of that warning. Instead, after the warning has been given to the driver, only if such driving that satisfies the required warning conditions is continued in excess of the previously set time, will the occurrence of the overtime event be stored into the information storage means. Storing the occurrence of the overtime event in this fashion provides an opportunity for the driver to correct his/her own driving state without feeling a mental burden. If the occurrence of such an overtime event can be immediately confirmed on the vehicle in the form of printout, the driver and the vehicle travel supervisor can immediately and accurately know the driving state involved with the particular overtime event. The driver's awareness of the importance of fuel saving can also be further improved.

In this fuel-saving management system, the information-processing means, further desirably, calculates an occurrence count of the above overtime event, then calculates an overtime event occurrence ratio from the occurrence count of the above overtime event. If the overtime event occurrence ratio exceeds a previously set value, adds warning mark display to information on the processed information output from the printer. Provided that the warning mark is displayed for each set of processed information in this way, the driver can immediately discriminate, from printer output, which set of processed information that the overtime event occurrence ratio relates to, even if the overtime event occurrence ratio exceeds the previously set value. For example, this overtime event occurrence ratio relates to a running distance of the vehicle.

In this fuel-saving management system, it is desirable that the information-processing means be able to calculate a fuel consumption rate of the vehicle and that the printer be able to output the fuel consumption rate. Traditionally, the fuel consumption rates of vehicles have not been detectable on the vehicle and have had to await later analysis at the vehicle owner/user company. If the fuel consumption rate can be output from the printer mounted on the vehicle, however, the driver's awareness of the importance of fuel saving can be further improved.

Desirably, the above fuel-saving management system further includes a travel starting switch operated during a start of vehicle operation, and a printing switch operated for printer output. It is also desirable in this system that when the travel starting switch is operated, the information-processing means should restart erasing the information relating to the processed information stored within the information storage means, and storing the information relating to the processed information, into the information storage means. Additionally, it is desirable in this system that when the printing switch is operated, the information-processing means should erase the information relating to the processed information stored within the information storage means.

In this way, the travel starting switch is assigned a function that restarts erasure of the information relating to the processed information stored within the information storage means, and storage of the information relating to the processed information, into the information storage means, and the printing switch is assigned a function that erases the information relating to the processed information stored within the information storage means. Accordingly, it is unnecessary to provide an independent switch for erasing the information relating to the processed information stored within the information storage means, and it is possible to reduce manufacturing costs and simplify switch operations.

It is desirable that the above fuel-saving management system should further include a setter mounted on the vehicle, the setter being adapted to modify the settings of the required warning conditions or of the previously set time. In the above fuel-saving management system, it is also desirable that the printer be able to output the required warning conditions or previously set time that have been newly set by the setter.

As described above, the setter allowing the settings of the required warning conditions to be modified is mounted on the vehicle, so when the settings of the required warning conditions in the fuel-saving management system are to be modified, there is no need to remove a vehicle-mounted analyzer from the vehicle temporarily for the above modification and send this analyzer to an owner/user company of the vehicle or a manufacturer thereof. The same also holds true for modifying the settings of the required warning conditions within the vehicle-mounted analyzer via a memory card onto which the warning conditions were stored in advance. In addition, if new settings of the required warning conditions or of the previously set time can be output from the printer on the vehicle, whether the settings were properly input can be immediately confirmed in printout form.

In order to solve the above-described problems, the present invention provides a further kind of fuel-saving management system including a vehicle-mounted analyzer or vehicle owner/user company's data analyzer for conducting analyses on fuel efficiency of a vehicle having an auxiliary brake. In this system, the vehicle-mounted analyzer includes information detection means for detecting a fuel flow rate and/or accelerator angle of the vehicle and information on use of the auxiliary brake. Also, the vehicle-mounted analyzer and/or the vehicle owner/user company's data analyzer includes: information-processing means for calculating, from the fuel flow rate and/or accelerator angle of the vehicle and from detected information on the use of the auxiliary brake, a cumulative traveling distance of the vehicle in a zero accelerator angle state with the auxiliary brake not being used; and information storage means for storing the cumulative traveling distance that the information detection means has calculated.

As described earlier herein, for a vehicle with an auxiliary brake, easing up on or releasing the accelerator pedal of the vehicle and using an engine brake in a minimum fuel injection state to extend the distance of decelerated vehicle operation as long as possible is correspondingly contributive to reduced fuel consumption. Use of the auxiliary brake such as an exhaust brake, however, is an extremely great causative factor in deteriorating fuel efficiency, since the use of the auxiliary brake results in unnecessary deceleration and makes it necessary to correspondingly step on the accelerator pedal once again for acceleration. Calculating the cumulative traveling distance of the vehicle in a released accelerator angle state with the auxiliary brake not being used, therefore, allows decelerated operation with the engine brake to be monitored properly and data analyses on fuel-saving operation to be supplied to the driver and the vehicle travel supervisor in an optimum form.

The desirable zero accelerator angle state in this fuel-saving management system is one in which the fuel flow rate is less than a previously set value and/or the accelerator angle is approximately equal to zero. During driving in the engine-braked state with the accelerator pedal released, although the fuel injected in a diesel engine, for example, is zero, an actual indication on a fuel flowmeter is usually not zero. In addition, a fixed amount of fuel is always injected in a gasoline engine vehicle. For these reasons, the zero accelerator angle state of the vehicle can be detected almost accurately by adopting, as a judgment criterion, a state in which the vehicle runs at a fuel injection rate less than or approximate to a previously set minimum fuel flow rate and/or at an approximately zero accelerator angle.

In this fuel-saving management system, it is further desirable that the vehicle should also include an auto-cruise system capable of adjusting the vehicle speed to a required value automatically, and that the information-processing means should judge the vehicle to be in a zero accelerator angle state during operation of the auto-cruise system when the fuel flow rate is less than its previously set value. During the operation of the auto-cruise system, the driver does not perform accelerator operations, so the zero accelerator angle state is difficult to judge from the accelerator angle. In this case, therefore, a state in which the fuel flow rate is less than the previously set value needs to be regarded as the zero accelerator angle state.

Desirably, the above fuel-saving management system should further include information detection means to detect the speed of the vehicle. Also, the information-processing means desirably calculates the cumulative traveling distance from the vehicle speed detected by the information detection means, and from an elapsed time of traveling in the zero accelerator angle state with the auxiliary brake not being used. Typically, vehicles already have a vehicle speed sensor as information detection means to detect the vehicle speed, and using this means to obtain cumulative traveling distance information is the simplest and most accurate method usable.

In the above fuel-saving management system, the vehicle-mounted analyzer desirably includes a printer that can output the cumulative traveling distance stored within the information storage means. This printer allows the driver and the vehicle travel supervisor to know a particular driving state both rapidly and accurately at any time by contrasting this driving state with an actual running state. The driver's (and others') awareness of the importance of fuel efficiency improvement can thus be further enhanced.

Effects of the Invention

In a fuel-saving management system of the present invention including, as means mounted on a vehicle, information detection means for detecting information on a driving state of the vehicle, information-processing means for, in addition to processing the information detected by the information detection means, generating a warning when the information processed satisfies required warning conditions, and information storage means for storing the processed information, a mental burden applied by the warning to a driver can be relieved since, when either a time during which the processed information is maintained to satisfy the required warning conditions, or an elapsed time of the processed information exceeds a previously set time, the information-processing means stores the occurrence of this overtime event into the information storage means.

In another fuel-saving management system including, as means mounted on a vehicle, information detection means for detecting information on a driving state of the vehicle, information-processing means for, in addition to processing the information detected by the information detection means, generating a warning when the information processed satisfies required warning conditions, since the system further includes a setter that allows modification of the required warning conditions, the setter also being mounted on the vehicle, it is possible to easily set and modify the required warning conditions such as the vehicle speed and other required warning values stored within a vehicle-mounted analyzer.

In yet another fuel-saving management system including, as means mounted on a vehicle, information detection means for detecting information on a driving state of the vehicle, information-processing means for processing the information, and information storage means for storing the information processed by the information-processing means, since the system further includes a printer mounted on the vehicle and capable of printing out the processed information stored within the information storage means, a driver and travel supervisor of the vehicle can immediately and accurately know a particular driving state thereon and the driver's awareness of importance of fuel saving can be further improved. In addition, a succession of fuel-saving management activities up to analysis can be conducted, even with a vehicle-mounted analyzer alone, and small-scale enterprises can thus introduce the system into respective business establishments even more easily.

Since a further kind of fuel-saving management system includes, in a vehicle-mounted analyzer, information detection means for detecting not only either a fuel flow rate or an accelerator angle, or both thereof, in the vehicle having an auxiliary brake, but also information on use of the auxiliary brake, and since this system includes, in the vehicle-mounted analyzer and/or a vehicle owner/user company's data analyzer, information-processing means for calculating a cumulative traveling distance of the vehicle in a zero accelerator angle state with the auxiliary brake not being used, and information storage means for storing the cumulative traveling distance calculated by the information detection means, decelerated driving with an engine brake particularly in a vehicle having an auxiliary brake can be properly monitored and fuel-saving management accuracy can be remarkably improved.

Any one of the fuel-saving management systems according to the present invention, therefore, yields an excellent effect that fuel-saving management and associated assistance to the driver can be conducted very smoothly.

BEST MODE FOR CARRYING OUT THE INVENTION

The best mode of embodiment of a fuel-saving management system according to the present invention will be described in detail below with reference to FIGS. 1 through 23.

Figure 1:
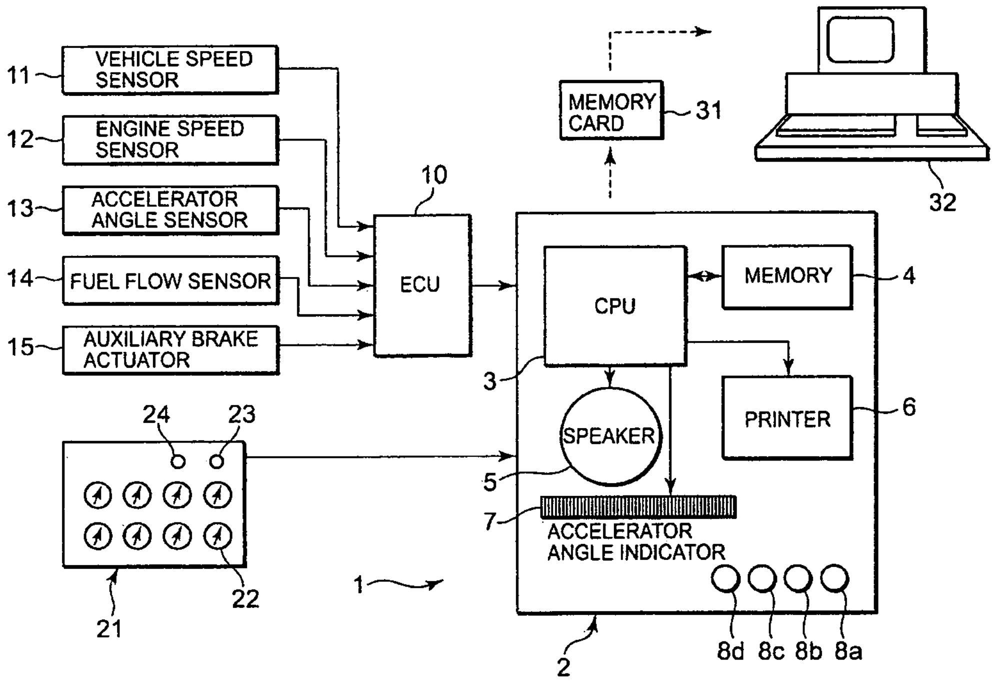
FIG. 1 is a block diagram showing a fuel-saving management system according to the present invention.

As shown in FIG. 1, a vehicle-mounted analyzer 1 is mounted, for example, on a motor vehicle such as a truck having an auxiliary brake, and includes an analyzer main unit 2, various information detectors such as a vehicle speed sensor 11, and a setter 21. The analyzer main unit 2 includes a CPU (information processor) 3 for processing information, a memory (information storage device) 4 for storing the CPU-processed information, a speaker 5 for delivering a buzzer or dummy voice warning based on a CPU command, a vehicle-mounted printer 6 which outputs the memory-stored information, and an accelerator indicator 7 for notifying a driver visually of a particular accelerator angle A. The vehicle-mounted printer 6 may be installed separately from the analyzer main unit 2. Also, the warning can be given by lamp activation, not through the speaker 5.

Figure 2:
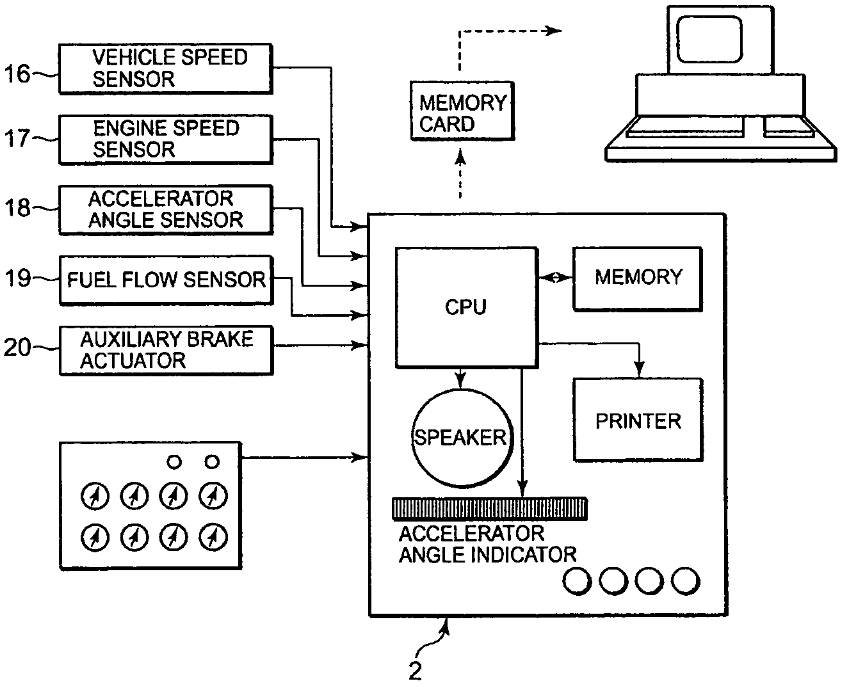
FIG. 2 is a block diagram showing a fuel-saving management system different from that of FIG. 1.

If the vehicle has a mounted ECU 10 and the ECU 10 is electrically connected to the vehicle speed sensor 11, engine speed sensor 12, accelerator angle sensor 13, fuel flow sensor 14, and auxiliary brake actuator 15, which are each an information detector, the ECU 10 and the analyzer main unit 2 are also electrically connected to each other. If the vehicle does not have the ECU, a vehicle speed sensor 16, an engine speed sensor 17, an accelerator angle sensor 18, and a fuel flow sensor 19 are each disposed as an information detector, and these detectors and the analyzer main unit 2 are electrically connected to one another, as shown in FIG. 2. An auxiliary brake actuator (information detector) 20 and the analyzer main unit 2 are also electrically connected to each other.

An operating state of the auxiliary brake is input from the above-mentioned auxiliary brake actuator 15, 20 to the analyzer main unit 2 via the ECU 10 or directly. This auxiliary brake, although represented by an exhaust brake, retarder, or the like in a truck, for example, is not always limited to these types.

As shown in FIG. 1, the setter 21 allows data to be set and modified using various selector switches 22. For example, the data described later herein includes: required warning values A1, A2 and previously set time T11, T26 relating to an accelerator angle A; a required warning value dA2 and previously set time T22 relating to an accelerator angle change dA; a required warning value E1 and previously set time T12 relating to an engine speed E; a required warning value S2 and previously set time T21 relating to a vehicle speed S; a required warning value dS2 and previously set time T23 relating to a vehicle speed change dS; a required warning time Tt2 and previously set time T24 relating to non-operation of a top gear; a required warning value B2 and previously set time T25 relating to an auxiliary brake usage ratio B; and a required warning time Ti3 and previously set time T31 relating to idling.

Also, necessary reports can be output from the vehicle-mounted printer 6 on an hourly fixed-time basis as described later herein, and it is possible to set whether the fixed-time output operation is to be executed, and to change this setting. Additionally, other various setting operations can be performed. Various data settings can be sent to the analyzer main unit 2 by pressing a settings change switch 23.

Figure 3:
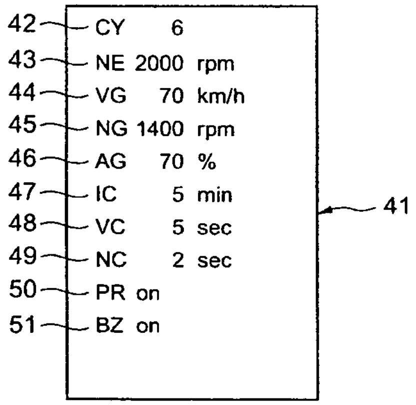
FIG. 3 is a diagram showing a warning settings printer report.

Various reports can be output from the vehicle-mounted printer 6. Three typical examples are described herein. FIG. 3 shows a warning settings report 41. The warning settings report 41 can be output at any time of day as required. Examples of the values displayed on the warning settings report 41 are: the number of engine cylinders, 42; a rated engine output speed 43; a required warning value (required warning condition) S2 44 against the vehicle speed S; a required warning value (required warning condition) E1 45 against the engine speed E; a required warning value (required warning condition) A1, A2 46 against the accelerator angle A; a required warning value (required warning condition) Ti3 47 against an elapsed idling time T1; a previously set time T21 48 relative to an overlimit event time Ts2 of the vehicle speed S; a previously set time T12 49 relative to an overlimit event time Te of the engine speed E; an operational status indication 50 of the vehicle-mounted printer 6; and an operational status indication 51 of the warning.

If necessary, other values may also be displayed. For example, these values are: the previously set time T11, T26 relative to an overlimit event time Ta1, Ta2 of the accelerator angle A; the required warning value (required warning condition) dA2 against the accelerator angle change dA, and the previously set time T22 against an overlimit event time Tds; the required warning value dS2 against the vehicle speed change dS, and the previously set time T23 relative to the overlimit event time Tds; the required warning time (required warning condition) Tt2 relative to a top-gear non-operation elapsed time Tt, and the previously set time T24 relative to the elapsed time Tt; the required warning time (required warning condition) B2 relative to the auxiliary brake usage ratio B, and the previously set time T25 relative to an overlimit event time Tb; and the previously set time T31 relative to the elapsed idling time Ti.

Since the values that have been set and/or modified using the setter 21, such as the previously set time T11 of the accelerator angle A, can be output from the vehicle-mounted printer 6 in this way, these settings and/or modifications on data such as the previously set time T11 of the accelerator angle A can be immediately and accurately confirmed on the vehicle in printout form.

Figure 4:
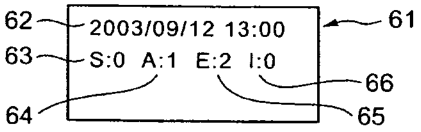
FIG. 4 is a diagram showing a fixed-time printer report.

FIG. 4 shows a fixed-time report 61. The fixed-time report 61 is output at fixed time intervals according to particular settings automatically, and this report is output to make the driver repeatedly recognize overlimit detections relating to particularly important parameters. A printing date and time 62, an overlimit event count 63 on the vehicle speed S, an overlimit event count 64 on the accelerator angle A, an overlimit event count 65 on the engine speed E, and an overlimit event count 66 on the elapsed idling time T1 are displayed on the fixed-time report 61. These counts will be described later herein.

Figure 5:
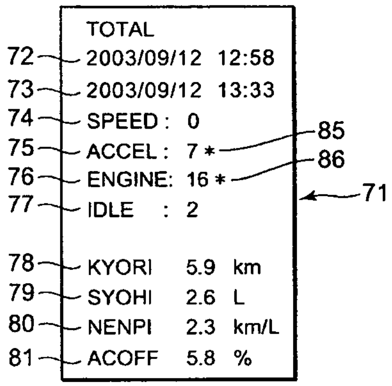
FIG. 5 is a diagram showing an overlimit data compilation printer report.

FIG. 5 shows an overlimit data compilation report 71. The overlimit data compilation report 71 can be output at any time of day as necessary. Compilation starting time 72, compilation ending time 73, an overlimit event count 74 on the vehicle speed S, an overlimit event count 75 on the accelerator angle A, an overlimit event count 76 on the engine speed E, an overlimit event count 77 on the elapsed idling time T1, a cumulative traveling distance 78, fuel consumption 79, a fuel consumption rate 80, and a traveling ratio 81 of the later-described cumulative traveling distance TL in a zero accelerator angle and auxiliary brake non-usage state with respect to a total cumulative traveling distance are each displayed on the overlimit data compilation report 71.

The CPU 3 calculates the above-mentioned cumulative traveling distance 78 and fuel consumption 79 from, for example, the vehicle speed S detected by the vehicle speed sensor 11, and the fuel flow rate F detected by the fuel flow sensor 14. The CPU 3 also calculates the above-mentioned fuel consumption rate 80 from the above-calculated cumulative traveling distance 78 and fuel consumption 79. Overlimit event counts on other parameters such as the accelerator angle change dA, vehicle speed change dS, non-operation of the top gear, and auxiliary brake usage ratio B, may also be displayed.

The vehicle speed S, the accelerator angle A, the engine speed E, the elapsed idling time T1, the fuel consumption rate, and the like are all important information for achieving fuel-saving. Fuel consumption, in particular, has not been detectable on the vehicle and has had to be later analyzed at the vehicle user/owner company. The driver's awareness of the importance of fuel saving can be further enhanced if fuel consumption can be output from the printer on the vehicle. Overlimit event counts on other parameters such as the accelerator angle change dA, vehicle speed change dS, non-operation of the top gear, and auxiliary brake usage ratio B, may also be displayed.

In the CPU 3, the overlimit event count 74 on the vehicle speed S, the overlimit event count 75 on the accelerator angle A, the overlimit event count 76 on the engine speed E, and the overlimit event count 77 on the elapsed idling time T1 are divided by the cumulative traveling distance 78 to obtain respective overlimit event occurrence rates Rs, Ra, Re, Ri. If the overlimit event occurrence rates Rs, Ra, Re, Ri exceed required set values Rso, Rao, Reo, Rio, respectively, warning marks 85, 86 are displayed for associated information items of the overlimit data compilation report 71.

FIG. 5 shows an example in which the overlimit event occurrence rates Ra, Re of the accelerator angle A and engine speed E are in excess of the required set values Rao, Reo, respectively. It is possible for the driver, by referring to such an example of the overlimit data compilation report 71, to immediately identify an information item associated with the overlimit event occurrence rate Rs, Ra, Re, Ri exceeding the required set value Rso, Rao, Reo, Rio. Display of the warning marks is not limited only to the above-mentioned overlimit event count 74 of the vehicle speed S, and the display may be made for other information such as the fuel consumption rate 80 and the traveling ratio 81 of the cumulative traveling distance TL in a zero accelerator angle and auxiliary brake non-usage state with respect to the total cumulative traveling distance.

The warning settings report 41 and the overlimit data compilation report 71 can be output from the vehicle-mounted printer 6 at any time by pressing a settings confirmation switch **8*a* and printing switch 8*b*, respectively, of the analyzer main unit 2. Various processed information that has been stored into the memory 4 of the analyzer main unit 2 can be sent to a vehicle owner/user company's data analyzer 32 provided at an owner/user company of the vehicle or a manufacturer thereof, via a memory card 31. The information can also be analyzed in detail using the vehicle owner/user company's data analyzer 32**.

A press of a travel starting switch **8*d* on the analyzer main unit 2 during a start of travel of the vehicle initiates storage of the various information that the CPU 3 processed, into the memory 4. Pressing the travel starting switch 8*d* or pressing the printing switch 8*b* independently thereof erases all existing information from the memory 4. Examples of operations on the travel starting switch 8*d* and on the printing switch 8*b*** are described below.

Figure 6:
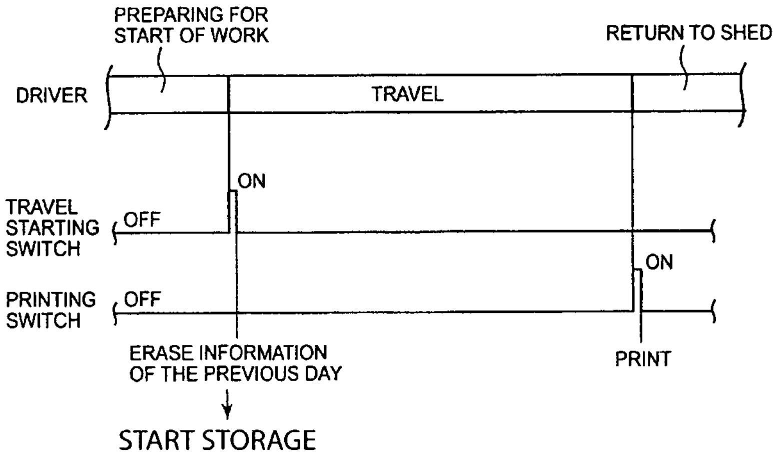
FIG. 6 is an explanatory diagram of travel starting switch and printing switch operations under normal conditions.

FIG. 6 shows a normal operation sequence. As shown in FIG. 6, when a person such as the driver (hereinafter, referred to as the system operator) presses the travel starting switch **8*d* to start the travel of the vehicle on a current day, all existing information within the memory 4 is erased and then the information that the CPU 3 processed is stored into the memory 4. During a return of the vehicle to a vehicle shed on the current day, when the system operator presses the printing switch 8*b*, the overlimit data compilation report 71 shown in FIG. 5 is output from the printer 6. The press of the printing switch 8*b* erases all information existing in the memory 4**.

Figure 7:
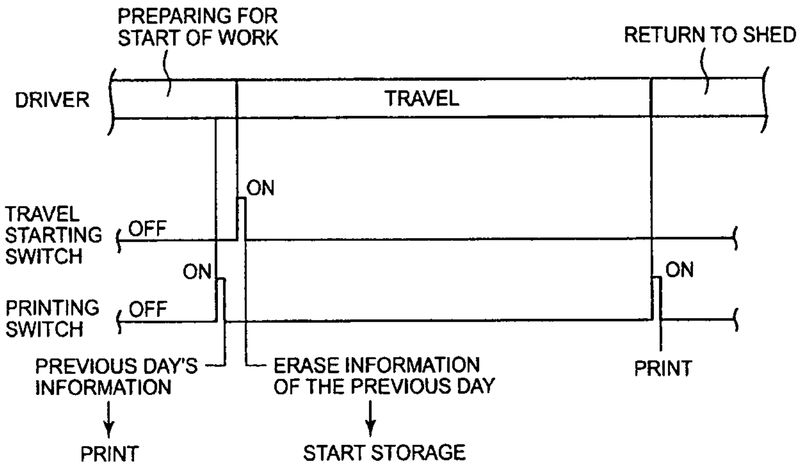
FIG. 7 is an explanatory diagram of the travel starting switch and printing switch operations assuming that the printing switch was not pressed at an end of a travel on an immediately previous day.

FIG. 7 shows a case in which the system operator neglected to press the above-described printing switch **8*b* at an end of the travel on an immediately previous day. In this case, before the traveling start of the vehicle on the current day, when the system operator presses the printing switch 8*b*, the overlimit data compilation report 71 shown in FIG. 5 is output from the printer 6 and all existing information is erased from the memory 4. When the system operator subsequently presses the travel starting switch 8*d* to start the travel of the vehicle, information that the CPU 3 processed is stored into the memory 4. After the return of the vehicle to the vehicle shed on the day, when the system operator presses the printing switch 8*b* in accordance with the normal operation sequence, the overlimit data compilation report 71 is output from the printer 6 and all existing information is erased from the memory 4**.

Figure 8:
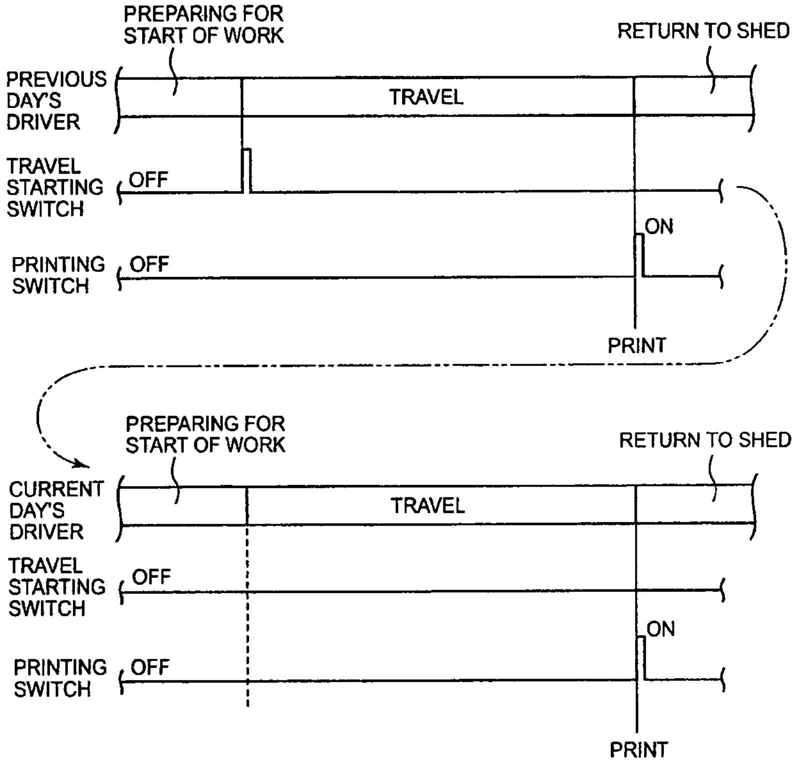
FIG. 8 is an explanatory diagram of the travel starting switch and printing switch operations assuming that the travel starting switch was not pressed at a start of a travel on a current day.

FIG. 8 shows a case in which the system operator neglected to press the travel starting switch **8*d* during the start of the travel on the day. In this case, if a power supply is turned on in spite of the fact that the system operator neglected to press the travel starting switch 8*d* during the start of the travel on the day, successive processes by the vehicle-mounted analyzer 1 are, as described later herein (see FIGS. 10, 22, and 23), restarted from where the processes were stopped on the previous day. In this case, various information that was stored into the memory 4 on the previous day is not erased and, for example, the day's overlimit event count 74** on the vehicle speed S is directly added to the previous day's overlimit event count thereof.

After this, during a return of the vehicle to the vehicle shed on the day, when the system operator presses the printing switch **8*b* in accordance with the normal operation sequence, the overlimit data compilation report 71 shown in FIG. 5 is output from the printer 6. In this case, the system operator can know the overlimit data compilation report 71 of the day by making comparative reference to this report and the overlimit data compilation report 71** of the previous day.

Endowing the travel starting switch 8*d* with the function of erasing various stored information from the memory 4 and restarting information storage thereinto, and endowing the printing switch 8*b* with the function of erasing various stored information from the memory 4 make it unnecessary to provide an independent special switch for information erasure from the memory 4 and allows reduction in manufacturing costs and the simplification of the switch operations.

Figure 9:
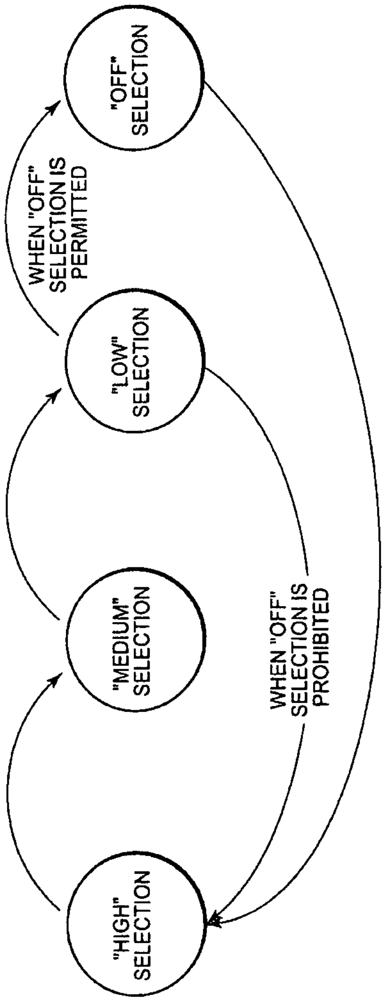
FIG. 9 is an explanatory diagram of selecting whether a warning is to be generated.

As shown in FIG. 9, the vehicle-mounted analyzer 1 described above allows the system operator to select a high, medium, or low level as a sound level or the like of the buzzer or dummy voice warning by changing a setting position of a warning selector switch 8*c* on the analyzer main unit 2. The warning selector switch 8*c* shown in FIG. 1 is of a push-button type, which allows the warning sound or the like to be sequentially changed from the high level to the medium level or from the medium level to the low level, or vice versa, with each press of the switch.

The system operator can also inhibit the generation of the buzzer or dummy voice warning by pressing the warning selector switch 8*c*. That is because there is also a need to enable the system operator to make a selection so that the buzzer or dummy voice warning is not generated in a specific running state of the vehicle. However, the driver can select non-generation of the warning, only when the warning setup switch 24 of the setter 21 is operated by the vehicle travel supervisor or the like beforehand to allow the selection of non-generation of the warning.

This makes appropriate fuel-saving management executable by prohibiting the driver from freely selecting non-generation of the warning. In other words, until the vehicle travel supervisor or the like has used the setter 21 to render non-generation of the warning selectable, the driver is prohibited from making the selection, whereby appropriate fuel-saving management becomes executable.

Next, warning monitoring by this fuel-saving management system will be described below referring to FIGS. 10 to 21.

Figure 10:
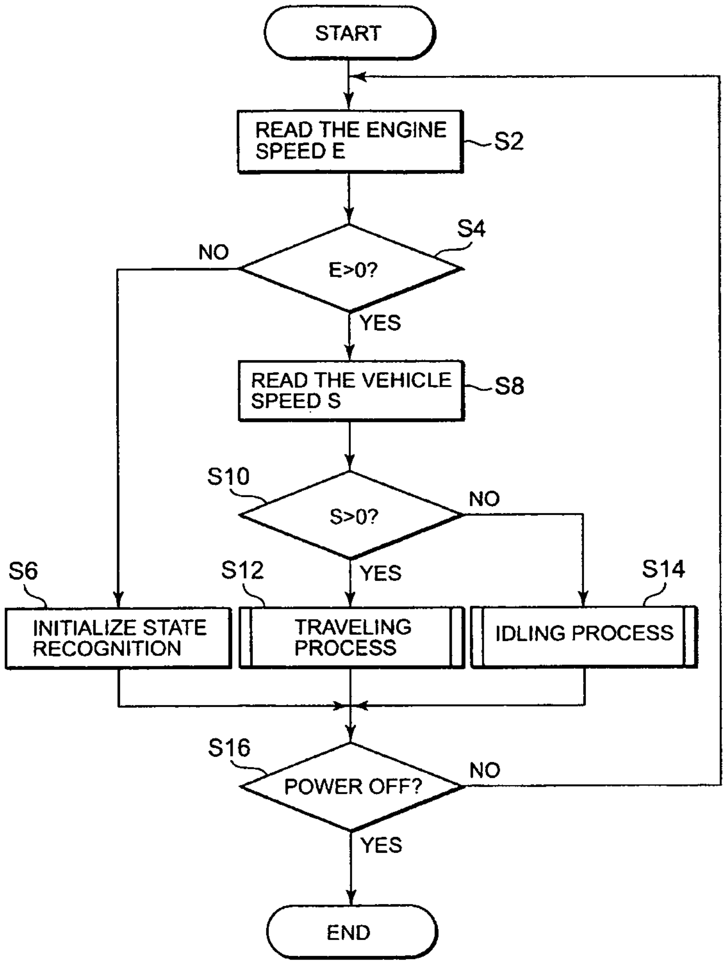
FIG. 10 is a flowchart that shows warning monitoring in the fuel-saving management system.

As shown in FIG. 10, the CPU 3 executes step S2 to read the engine speed E that the engine speed sensor 12, 17 has detected, and then executes step S4 to judge whether the engine speed E is in excess of zero. If judgment results in step S4 are negative (No), that is, if the engine is in a stopped state, the CPU initializes state recognition in step S6. If the judgment results in step S4 are positive (Yes), that is, if the engine is in operation, the CPU executes step S8 to read the vehicle speed S that the vehicle speed sensor 11, 16 has detected, and then executes step S10 to judge whether the vehicle speed S is in excess of zero. If judgment results in step S10 are positive, that is, if the vehicle is running, the CPU conducts step S12 to execute the traveling process shown in FIG. 11.

Figure 21:
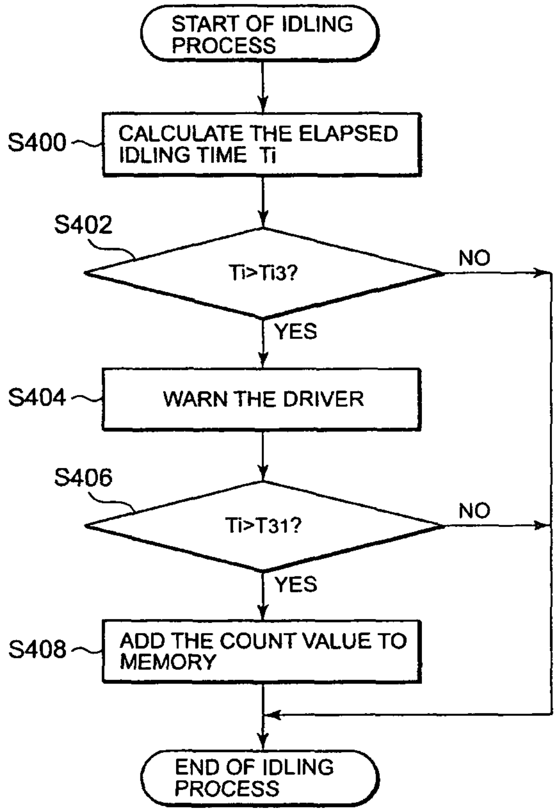
FIG. 21 is a flowchart that shows the idling process step shown in FIG. 10.

If the judgment results in step S10 are negative, that is, if the vehicle is stopped, the CPU conducts step S14 to execute the idling process shown in FIG. 21. After initializing state recognition in step S6 or executing the traveling process in step S12 or the idling process in step S14, the CPU judges in step S16 whether the power supply is turned off. If judgment results in step S16 are negative, step S2 onward is repeated once again. Warning monitoring is terminated if the judgment results in step S16 are positive.

Figure 11:
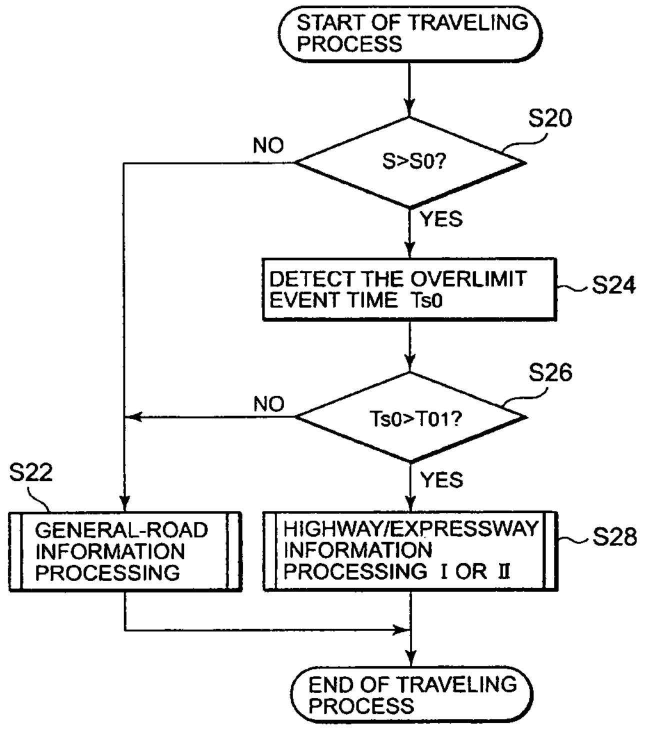
FIG. 11 is a flowchart that shows the traveling process step shown in FIG. 10.

As shown in FIG. 11, the traveling process is executed in the sequence below. In step S20, the CPU 3 judges whether the vehicle speed S that the CPU read in step S8 is in excess of a previously set value So of the vehicle speed S that was set for judging whether the vehicle is traveling on a highway or an expressway. If judgment results in step S20 are negative, that is, if the vehicle speed S is not greater than the previously set value So, the CPU conducts step S22 to execute general-road information processing shown in FIGS. 12 and 13.

If the judgment results in step S20 are positive, an overtime event time Ts0 during which the vehicle speed S is in excess of the previously set value So is further detected in step S24 and a judgment is made in step S26 to judge whether the overtime event time Ts0 is in excess of a previously set time T01 that has been set for judging whether the vehicle is continuously traveling on a highway/expressway. If judgment results in step S26 are positive, either highway/expressway information processing I shown in FIGS. 14 to 16, or highway/expressway information processing II shown in FIGS. 17 to 20 is executed in step S28. If the judgment results in step S26 are negative, the general-road information processing in step S22 is executed, because the vehicle is not continuously traveling on a highway/expressway. The traveling process is now complete.

Figure 12:
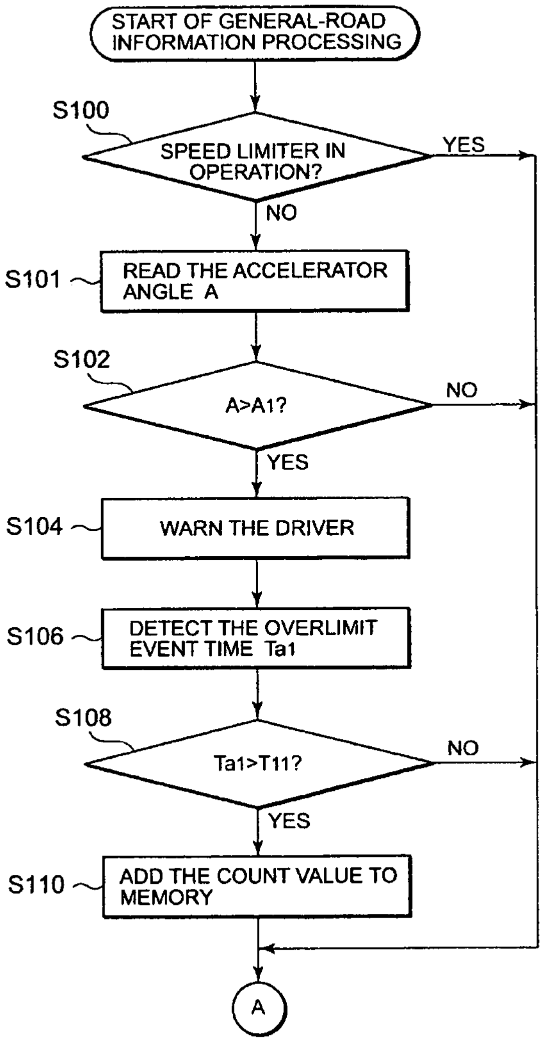
FIG. 12 is a flowchart that shows general-road information processing shown in FIG. 11.

As shown in FIG. 12, general-road information processing in FIG. 11 is executed in the sequence below using the vehicle speed S, engine speed E, accelerator angle A, and elapsed idling time T1 that the CPU 3 processes as general-road information. If the vehicle has a speed limiter capable of automatically adjusting the vehicle speed S to the required speed value or less, the CPU 3 executes step S100 to detect an operating signal of the speed limiter and judge whether the limiter is in operation. For example, the operating signal of the speed limiter can be easily obtained from the ECU 10.

Figure 13:
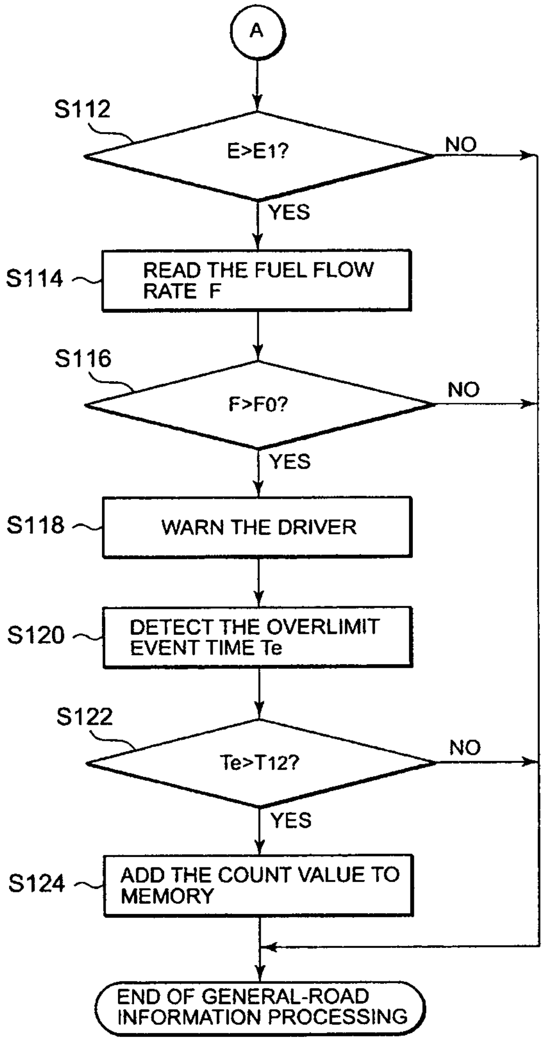
FIG. 13 is a flowchart that shows a continuation of general-road information processing shown in FIG. 12.

If judgment results in step S100 are positive, that is, if the speed limiter is in operation, only step S112 onward in FIG. 13 is executed and steps S101 to S110 are skipped. This prevents a fuel injection rate responding to the required speed from being exceeded by an action of the speed limiter, even if the driver steps on the accelerator pedal and renders the accelerator angle excessive during the operation of the speed limiter. The driver warning or the like relating to the accelerator angle A, therefore, may be issued when the speed limiter is inactive. The sense of discomfort that may be given to the driver by the generation of an unnecessary warning or the like can thus be excluded. The driver warning or the like relating to the accelerator angle A, therefore, can also be issued when the speed limiter is active.

If the judgment results in step S100 are negative, that is, if the speed limiter is inactive, the CPU 3 executes step S101 to read the accelerator angle A that the accelerator angle sensor 13, 18 has detected, and then executes step S102 to judge whether the accelerator angle A is in excess of a required warning value A1 provided for judging whether the accelerator pedal is stepped on excessively. If judgment results in step S102 are positive, that is, if the driver has stepped on the accelerator pedal excessively, step S104 is executed to warn the driver via the speaker 5 using a buzzer or the like.

Next, the CPU 3 executes step S106 to detect the overtime event time Ta1 during which the accelerator angle A is in excess of the required warning value A1, and then executes step S108 to judge whether the overtime event time Ta1 is in excess of the previously set time T11. If judgment results in step S108 are positive, that is, if the driver has continued to excessively step on the accelerator pedal even after the warning in step S104, step S110 is executed to add an overlimit event count value (occurrence rate of overlimit events) to the memory 4 and store a cumulative overlimit event count and a cumulative overlimit event time.

During traveling on general roads, the accelerator angle A, in particular, significantly affects fuel efficiency. Appropriate fuel-saving management can therefore be conducted by storing the occurrence of warnings and overlimit events based on the accelerator angle A. For a vehicle without the speed limiter, step S102 or S110 may be executed without above-described judgment step S100 being conducted.

If judgment results in above-described step S102 are negative, this indicates that the accelerator angle A is not greater than the required warning value A1 and that the driver is not excessively stepping on the accelerator pedal. If judgment results in above-described step S108 are negative, this indicates that the above-mentioned overtime event time Ta1 is not grater than the previously set time T11 and that the driver has responded to the warning and stopped excessively stepping on the accelerator pedal. If any one of the above cases occurs or if the overlimit event count value is added to the memory 4 in step S110, the CPU 3 executes step S112 to judge whether the engine speed E that the CPU read in step S2 is in excess of a required warning value E1 provided for judging whether the speed E is at a level that deteriorates fuel efficiency, as shown in FIG. 13.

If judgment results in above-described step S112 are positive, that is, if the driver is driving at such an engine speed E that deteriorates fuel efficiency, the CPU 3 executes step S114 to read the fuel flow rate F that the fuel flow sensor 14, 19 has detected, and then executes step S116 to judge whether the fuel flow rate F is in excess of a previously set value Fo associated with the minimum injection during the vehicle travel.

For vehicles with a diesel engine, since the minimum fuel injection rate during the vehicle travel takes a zero value obtained when the accelerator pedal is released, the previously set value Fo is set to a value very close to zero. The previously set value Fo here is set to a value unequal to zero, because, even if an actual fuel injection rate is equal to zero, the fuel flow sensor 14, 19 may often indicate a value equal to other than zero. For vehicles with a gasoline engine, since fuel is injected at a definite rate even by reducing a stepping pressure of the accelerator pedal during the vehicle travel, the previously set value Fo is set to a value close to such a fuel injection rate.

If judgment results in above-described step S116 are positive, that is, if the driver is driving at such an engine speed E that deteriorates fuel efficiency, the CPU 3 conducts essentially the same processes as those of steps S104-S110 described above. That is to say, the CPU executes step S118 to warn the driver, and then executes step S120 to detect the overlimit event time Te during which the engine speed is in excess of the required warning value E1. The CPU also executes step S122 to judge whether the overlimit event time Te has exceeded the previously set time T12, and then if the judgment results in step S122 are positive, executes step S124 to add the overlimit event count value to the memory 4. Accordingly, the cumulative overlimit event count and the cumulative overlimit event time are stored into the memory 4.

If the judgment results in step S112 are negative, this indicates that the engine speed E is not greater than the required warning value E1 and that the speed E is not a speed that deteriorates fuel efficiency. If the judgment results in step S116 are negative, this indicates that the fuel flow rate F is not greater than the previously set value Fo associated with the minimum injection during the vehicle travel. If judgment results in step S122 are negative, this indicates that the above-mentioned overtime event time Te relating to the engine speed E is not greater than the previously set time T12 and that the driver has controlled the engine speed E in response to the warning. If any one of the above cases occurs or if the overlimit event count value is added to the memory 4 in step S124, the CPU 3 terminates general-road information processing.

During general-road information processing described above, the warning or the like about the engine speed E is generated only when the fuel flow rate F is in excess of the previously set value Fo associated with the minimum injection during the vehicle travel. This warning or the like is generated because, for example, during engine brake application, even if the engine speed E increases above the required speed value E1, fuel efficiency is not deteriorated since the engine is in a minimum fuel injection state. Therefore, there is no need in such a case to warn the driver, and the sense of discomfort that may be given to the driver can be excluded by avoiding unnecessary warning or the like.

Figure 14:
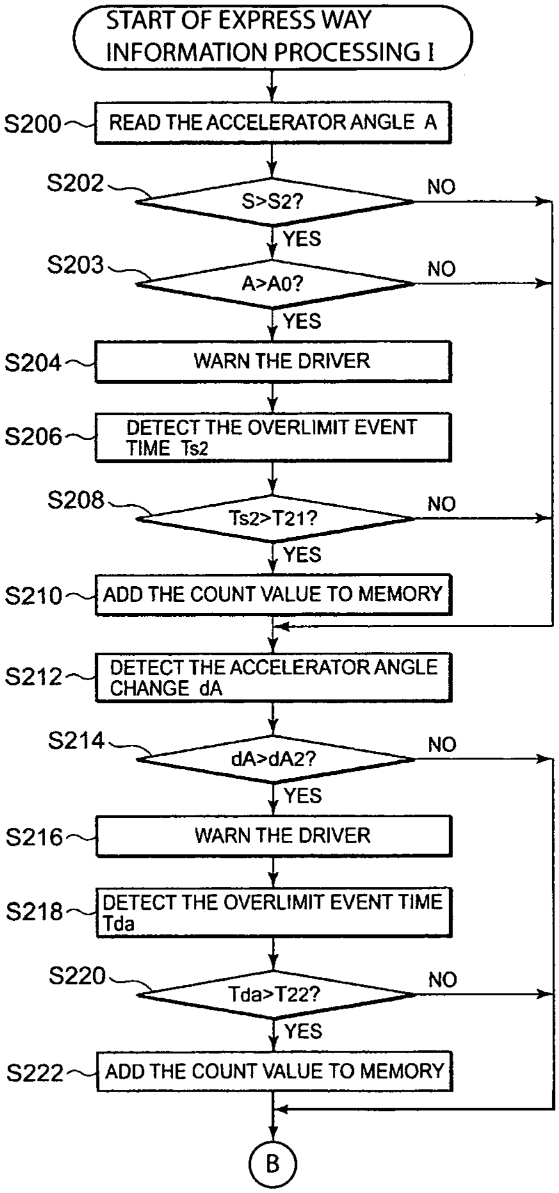
FIG. 14 is a flowchart that shows highway/expressway information processing I shown in FIG. 11.

As shown in FIG. 14, highway/expressway information processing in FIG. 11 is executed in the sequence below using the vehicle speed S, accelerator angle change dA, vehicle speed change dS, top-gear non-operation elapsed time Tt2, and auxiliary brake usage ratio B that the CPU 3 processes as highway/expressway information. In provision for later processing, the CPU 3 first executes step S200 to read the accelerator angle A that the accelerator angle sensor 13, 18. Next, the CPU 3 executes step 202 to judge whether the vehicle speed S that the CPU read in step S8 is in excess of a required warning value S2 provided for judging whether the vehicle is traveling at a speed that deteriorates fuel efficiency.

If judgment results in step S202 are positive, that is, if the driver is driving at speed that deteriorates fuel efficiency, the CPU 3 executes step S203 to judge whether the accelerator angle A that the CPU read in step S200 is in excess of a previously set value Ao. If judgment results in step S203 are positive, step S204 is executed to warn the driver via the speaker 5 using a buzzer or the like.

Next, the CPU 3 executes step S206 to detect the overtime event time Ts2 during which the vehicle speed S is in excess of a required warning time S2, and then executes step S208 to judge whether the overtime event time Ts2 is in excess of the previously set time T21. If judgment results in step S206 are positive, that is, if the driver has continued to excessively step on the accelerator pedal even after the warning in step S204, step S210 is executed to add the overlimit event count value to the memory 4 and store the cumulative overlimit event count and the cumulative overlimit event time.

The warning about the vehicle speed S is thus generated only when the accelerator angle A is in excess of the previously set value Ao. This warning is generated because, for example, during traveling on a downslope of a highway/expressway, even if a gradient of the downslope increases the vehicle speed S above the required warning value S2, fuel efficiency is not deteriorated since an actual fuel injection rate at small accelerator angle A is small. Therefore, there is no need in such a case to warn the driver, and the sense of discomfort that may be given to the driver can be excluded by avoiding unnecessary warning or the like.

If judgment results in step S202 are negative, this indicates that the vehicle speed S is not greater than the required warning value S2 and that the driver is not driving at a vehicle speed that deteriorates fuel efficiency. If judgment results in step S203 are negative, this indicates that the accelerator angle A is not greater than the required angle value A0. If judgment results in step S208 are negative, this indicates that the above-mentioned overtime event time Ts2 is not greater than the previously set time T21 and that the driver has responded to the warning and stopped driving at a vehicle speed that deteriorates fuel efficiency. If any one of the above cases occurs or if the overlimit event count value is added to the memory 4 in step S210, the CPU 3 executes step S212 to determine, from the accelerator angle A read in step S200, an accelerator angle variation ΔA within a fixed brief time ΔT, and then calculate the accelerator angle change dA per the following expression (1):

$$dA = \Delta A/\Delta T \quad (1)$$

The CPU 3 executes step S214 to judge whether the accelerator angle change dA is in excess of a required warning value dA2 provided for judging whether the accelerator angle is excessively changing. If judgment results in step S214 are positive, that is, if it is judged that the driver is excessively changing the accelerator angle, the CPU 3 conducts essentially the same processes as those of steps S202-S208 described above. That is to say, the CPU executes step S216 to warn the driver, and then executes step S218 to detect an overlimit event time Tda during which the accelerator angle change dA is in excess of the required warning value dA2. The CPU also executes step S220 to judge whether the overlimit event time Tda has exceeded the previously set time T22, and then if judgment results in step S220 are positive, executes step S222 to add the overlimit event count value to the memory 4. Accordingly, the cumulative overlimit event count and the cumulative overlimit event time are stored into the memory 4.

During traveling on highways/expressways, the accelerator angle change dA, in particular, significantly affects fuel efficiency. Appropriate fuel-saving management can therefore be conducted by storing the occurrence of warnings and overlimit events based on the accelerator) angle dA.

Figure 15:
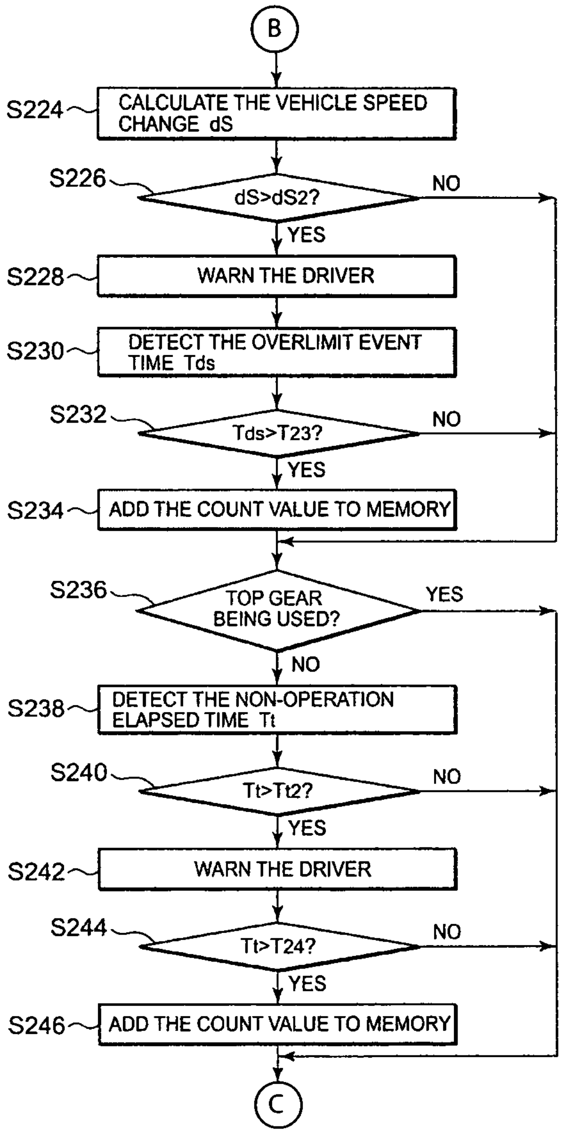
FIG. 15 is a flowchart that shows a continuation of highway/expressway information processing I of FIG. 14.

If judgment results in step S214 are negative, this indicates that the accelerator angle A is not greater than the required warning value dA2 and that the drive is not excessively changing the accelerator angle. If judgment results in step S220 are negative, this indicates that the above-mentioned overtime event time Tda is not greater than the previously set time T22 and that the driver has responded to the warning and stopped excessively changing the accelerator angle. If any one of the above cases occurs or if the overlimit event count value is added to the memory 4 in step S222, the CPU 3 executes step S224, as shown in FIG. 15, to determine, from the vehicle speed S read in step S8, a vehicle speed variation ΔS within the fixed brief time ΔT, and then calculate the vehicle speed change dS per the following expression (2):

$$dS = \Delta S/\Delta T \quad (2)$$

The CPU 3 executes step S226 to judge whether the vehicle speed change dS is in excess of a required warning value dS2 provided for judging whether the vehicle speed is suffering from a change that deteriorates fuel efficiency. If judgment results in step S226 are positive, that is, if it is judged that the driver is excessively changing the vehicle speed to such an extent that fuel efficiency deteriorates, the CPU 3 conducts essentially the same processes as those of steps S202-S208 described above. That is to say, the CPU executes step S228 to warn the driver, and then executes step S230 to detect an overlimit event time Tds during which the vehicle speed change dS is in excess of the required warning value dS2. The CPU also executes step S232 to judge whether the overlimit event time Tds has exceeded the previously set time T23, and then if judgment results in step S230 are positive, executes step S234 to add the overlimit event count value to the memory 4. Accordingly, the cumulative overlimit event count and the cumulative overlimit event time are stored into the memory 4.

If judgment results in step S226 are negative, this indicates that the vehicle speed change dS is not greater than the required warning value dS2 and that the driver is not excessively changing the vehicle speed to such an extent that fuel efficiency deteriorates. If judgment results in step S232 are negative, this indicates that the overlimit event time Tds has exceeded the previously set time T23 and that the driver has controlled the vehicle speed change dS in response to the warning. If any one of the above cases occurs or if the overlimit event count value is added to the memory 4 in step S232, the CPU 3 executes step S236 to estimate and judge whether the top gear is being used, from the engine speed E read in step S2 and from the vehicle speed S read in step S8.

If judgment results in step S236 are negative, that is, if the driver is not using the top gear, the top-gear non-operation elapsed time Tt is detected in step S238 and whether the top-gear non-operation elapsed time Tt has exceeded a required warning time Tt2 is judged in step S240. If judgment results in step S240 are positive, that is, if the driver is not using the top gear in excess of required warning time Tt2, the CPU 3 conducts essentially the same processes as those of steps S202-S208 described above. That is to say, the CPU executes step S242 to warn the driver, and then executes step S242 to judge whether the top-gear non-operation elapsed time Tt has exceeded the previously set time T24, and then if judgment results in step S244 are positive, executes step S246 to add the overlimit event count value to the memory 4. Accordingly, the cumulative overlimit event count and the cumulative overlimit event time are stored into the memory 4.

Figure 16:
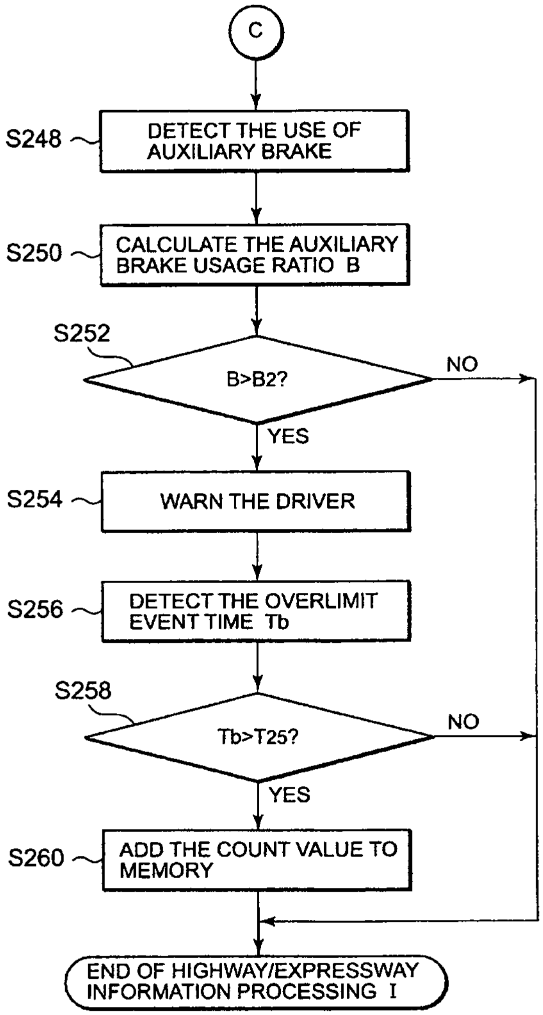
FIG. 16 is a flowchart that shows a further continuation of highway/expressway information processing I shown in FIG. 15.

If the judgment results in step S236 are positive, this indicates that the driver is using the top gear and driving the vehicle so as to prevent fuel efficiency from deteriorating. If the judgment results in step S240 are negative, this indicates that the above-described elapsed time Tt is not greater than the previously set time T24 and that the driver has performed a shift-up to use the top gear in response to the warning. If any one of the above cases occurs or if the overlimit event count value is added to the memory 4 in step S246, the CPU 3 executes, as shown in FIG. 16, step S248 to detect whether the auxiliary brake is being used, from a state of the auxiliary brake actuator 15, 20, and step S250 to calculate the auxiliary brake usage ratio B from the number of auxiliary braking operations, N, at a definite traveling distance Lo, per the following expression (3):

$$B = N/Lo \quad (3)$$

The CPU 3 executes step S252 to judge whether the auxiliary brake usage ratio B is in excess of a required warning value B2 provided for judging whether the auxiliary brake usage ratio is such that fuel efficiency deteriorates. If judgment results in step S252 are positive, the CPU 3 conducts essentially the same processes as those of steps S202-S208 described above. That is to say, the CPU executes step S254 to warn the driver, and then executes step S256 to detect the overlimit event time Tb during which the auxiliary brake usage ratio B is in excess of the required warning value B2. The CPU also executes step S258 to judge whether the overlimit event time Tb has exceeded the previously set time T25, and then if judgment results in step S258 are positive, executes step S260 to add the overlimit event count value to the memory 4. Accordingly, the cumulative overlimit event count and the cumulative overlimit event time are stored into the memory 4.

If the judgment results in step S252 are negative, this indicates that the auxiliary brake usage ratio B is not greater than the required warning value B2 and that the driver is driving the vehicle to prevent fuel efficiency from deteriorating. If judgment results in step S256 are negative, this indicates that the above-described overlimit event time Tb is not greater than the previously set time T25 and that the driver has responded to the warning and stopped excessively using the auxiliary brake. Highway/expressway information processing I is terminated if any one of the above cases occurs or if the overlimit event count value is added to the memory 4 in step S258.

As is evident from FIGS. 14 to 16, the warning (or the like) to the driver, based on the accelerator angle A, is not generated during highway/expressway information processing I described above. This is because, during highway/expressway driving, high engine output is typically required, that is, necessity for stepping on the accelerator pedal is also high. When necessary, however, it is possible to generate the warning or the like to the driver, based on the accelerator angle A. Processing in that case is shown as highway/expressway information processing II in FIGS. 17 to 20.

Figure 17:
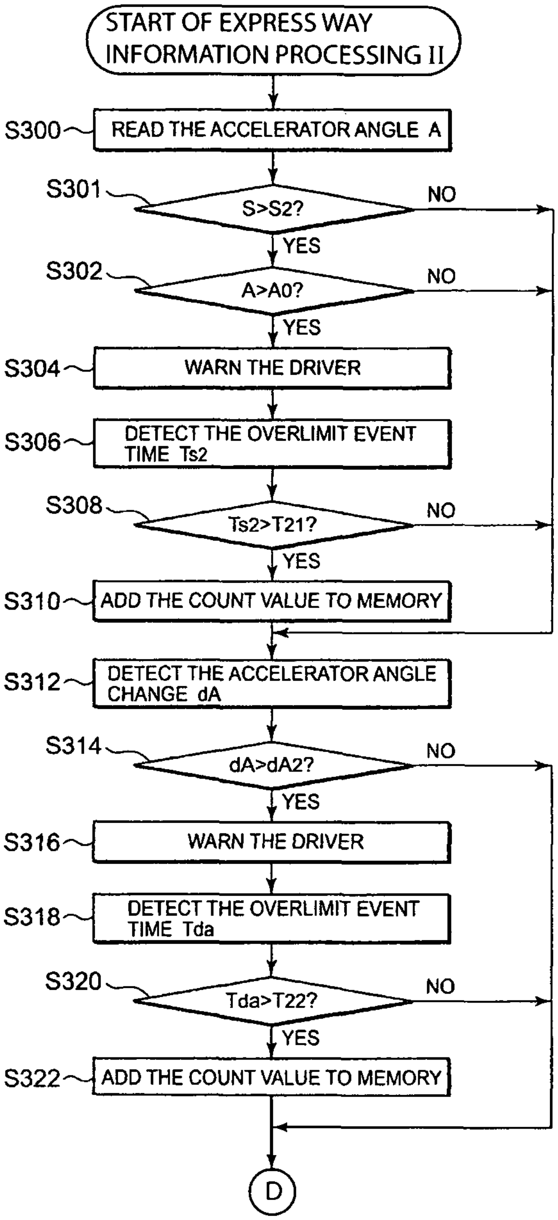
FIG. 17 is a flowchart that shows highway/expressway information processing II of FIG. 11.
Figure 18:
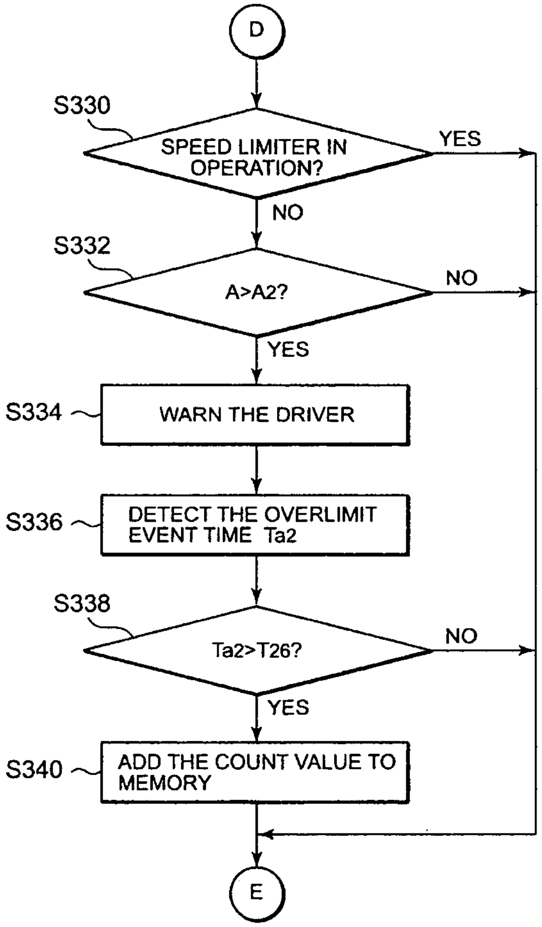
FIG. 18 is a flowchart that shows a continuation of highway/expressway information processing II of FIG. 17.

The steps S300 to S322 of highway/expressway information processing II, shown in FIG. 17, are essentially the same as the above-described steps S200 to S222 of highway/expressway information processing I, shown in FIG. 14. If the vehicle has a speed limiter capable of automatically adjusting the vehicle speed S to the required speed value or less, the CPU 3 executes step S330 to detect an operating signal of the speed limiter and judge whether the limiter is in operation.

Figure 19:
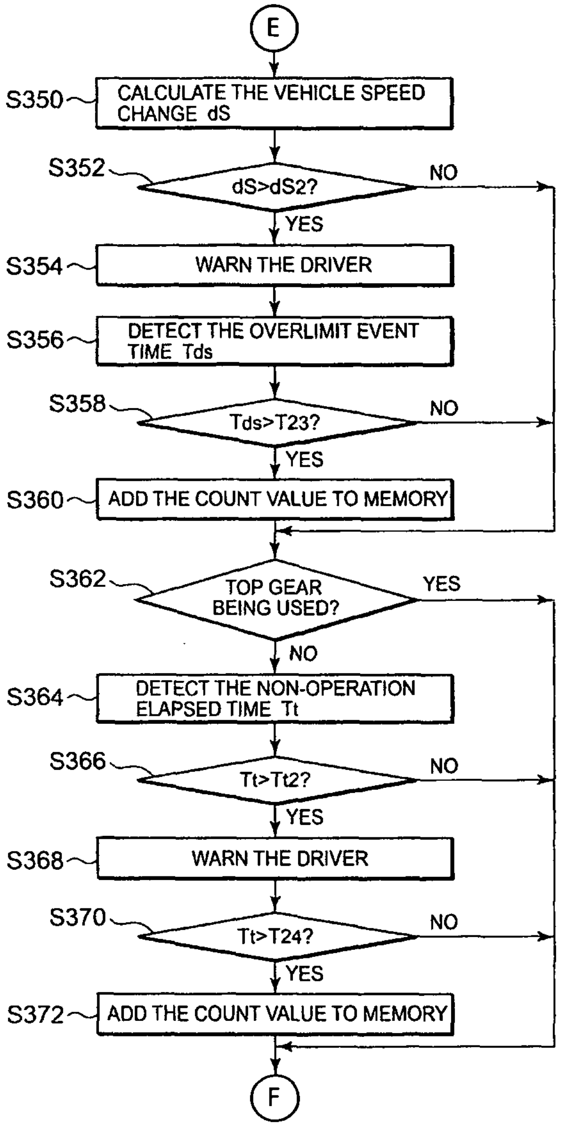
FIG. 19 is a flowchart that shows a further continuation of highway/expressway information processing II shown in FIG. 18.

If judgment results in step S330 are positive, that is, if the speed limiter is in operation, only step S350 onward in FIG. 19 is executed and steps S322 to S340 are skipped. The reason for this is the same as for the above-described general-road information processing step S100 shown in FIG. 12. If the judgment results in step S330 are negative, that is, if the speed limiter is inactive, the CPU 3 executes step S332 to judge whether the accelerator angle A is in excess of the required warning value A2 provided for judging whether the accelerator pedal is being stepped on excessively. If judgment results in step S332 are positive, step S334 is executed to warn the driver via the speaker 5 using a buzzer or the like.

Next, the CPU 3 executes step S336 to detect the overtime event time Ta2 during which the accelerator angle A is in excess of the required warning value A2, and then executes step S338 to judge whether the overtime event time Ta2 is in excess of the previously set time T26. If judgment results in step S338 are positive, step S340 is executed to add the overlimit event count value to the memory 4 and store the cumulative overlimit event count and the cumulative overlimit event time. When the speed limiter is active, the driver warning or the like relating to the accelerator angle A can also be generated. If the vehicle does not have the speed limiter, steps S332 to S340 may be executed without the above-described judgment step S330 being conducted.

Figure 20:
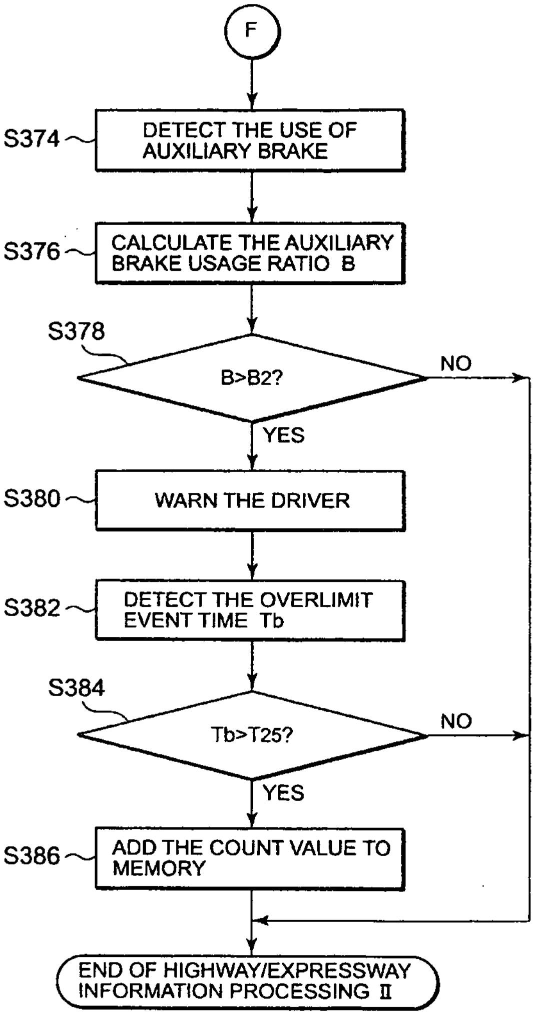
FIG. 20 is a flowchart that shows a further continuation of highway/expressway information processing II shown in FIG. 19.

If the judgment results in step S332 are negative, if the judgment results in step S338 are negative, or if the overlimit event count value is added to the memory 4 in step S340, the CPU executes steps S350 to S386 as shown in FIGS. 19 and 20. These steps S350 to S386 are essentially the same as the above-described steps S224 to S260 of highway/expressway information processing I in FIGS. 15 and 16.

As shown in FIG. 21, the idling process shown in FIG. 10 is executed in the sequence below. That is, the CPU 3 executes step S400 to detect the elapsed idling time T1 and then executes step S402 to judge whether the elapsed idling time T1 has exceeded the required warning time T13. If judgment results in step S402 are positive, that is, if the driver has continued idling in excess of the required warning time T13, step S404 is executed to warn the driver via the speaker 5 using a buzzer or the like.

The CPU 3 further executes step S406 to judge whether the elapsed idling time T1 has exceeded the previously set time T31. If judgment results in step S406 are positive, that is, if, even after the warning in step S404, the driver has continued idling in excess of the previously set time T31, step S408 is executed to add the overlimit event count value to the memory 4 and store the cumulative overlimit event count and the cumulative overlimit event time.

The idling process is terminated if the judgment results in step S402 are negative, that is, if it is judged that the elapsed idling time T1 is not greater than the warning time T13 and that the driver has not stopped the idling vehicle, or if the judgment results in step S406 are negative, that is, if it is judged that the elapsed idling time T1 is not greater than the previously set time T31 and that the driver has stopped the engine in response to the warning, or if the overlimit event count value is added to the memory 4 in step S408.

In this phase, the above-mentioned time T11 or T31 can have its setting changed using the setter 21 mounted on the vehicle. To change the setting of the previously set time T11 or the like, therefore, it is unnecessary to remove the analyzer main unit 2 temporarily from the vehicle and send the main unit 2 to a vehicle base or manufacturer of this vehicle for the change of the setting or to create a memory card onto which the previously set time T11 or the like is to be stored, and use this memory card to modify any settings of the analyzer main unit 2. In this way, according to this fuel-saving management system, the previously set time T11 and other time settings that were stored into the analyzer main unit 2 can be modified on the vehicle both rapidly and easily using the above-described setter 21. Fuel-saving management can therefore be performed very smoothly.

In addition, the occurrence of a warning is not stored into the memory 4 simultaneously with the occurrence of the warning. Instead, after the warning has been given to the driver, only if a driving state satisfying the required warning conditions or the like is continued in excess of the previously set time T11 or the like, will the occurrence of the overtime event be stored into the memory 4. Storing the occurrence of the overtime event in this fashion provides an opportunity for the driver to correct his/her own driving state without feeling a mental burden. Fuel-saving management can therefore be performed very smoothly.

Furthermore, for example, during driving on a highway or an expressway, if the driver cannot maintain an appropriate spacing from an immediately preceding vehicle, he/she may repeat hastening to slow down and then speed up again in order to catch up with the preceding vehicle. Driving in this fashion not only poses safety-associated problems, but also forms one of main causes of fuel efficiency deterioration, particularly during driving on highways or expressways. In this way, fuel-saving management has its viewpoint differing between driving on general roads and driving on highways/expressways, and this difference, in turn, causes a difference in the type of information required for fuel efficiency analysis. According to this fuel-saving management system, appropriate fuel-saving management can be performed since information is processed independently for general-road driving, and highway/expressway driving each.

Besides, the driver and the vehicle travel supervisor can immediately and accurately know a particular driving state of the vehicle thereon in printout form, and the driver's awareness of the importance of fuel saving can be further improved. In addition, a succession of fuel-saving management activities up to analysis can be conducted, even with the vehicle-mounted analyzer 1 alone, in which case, the vehicle owner/user company's data analyzer 32 requiring great costs for equipment introduction and operation, in particular, becomes unnecessary and small-scale enterprises can introduce the system into respective business establishments even more easily.

Next, decelerated operation monitoring by this fuel-saving management system will be described below referring to FIGS. 22 and 23.

For slowdown of the traveling vehicle, a greater contribution can be made to fuel-saving, by easing up on or releasing the accelerator pedal and using an engine brake in a minimum fuel injection state to extend a distance of decelerated vehicle operation as long as possible. However, for vehicles with an auxiliary brake represented by an exhaust brake, a retarder, or the like, since excellent braking characteristics can be easily be obtained by applying this auxiliary brake, there is a tendency to repeat abrupt deceleration and abrupt acceleration coupled therewith, and reduction in fuel efficiency is caused primarily by the repetition of these operations. For these reasons, this fuel-saving management system appropriately monitors the decelerated operation that uses an engine brake particularly in a vehicle having the auxiliary brake.

Figure 22:
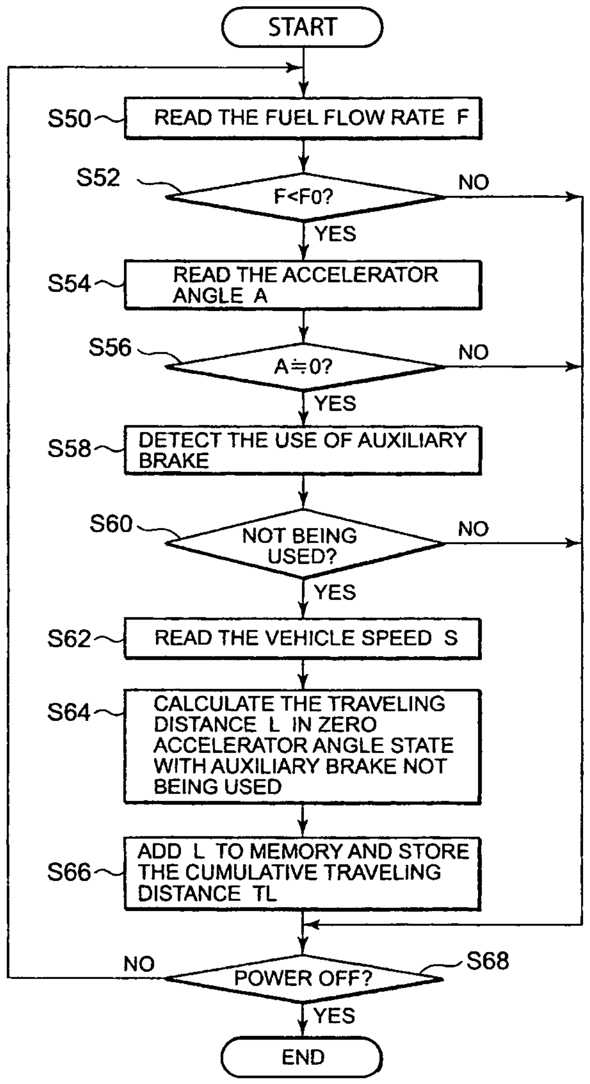
FIG. 22 is a flowchart that shows decelerated drive monitoring in the fuel-saving management system.

As shown in FIG. 22, the CPU 3 executes step S50 to read the fuel flow rate F that the fuel flow sensor 14, 19 has detected, and then executes step S52 to judge whether the fuel flow rate F is less than the previously set value Fo associated with the minimum injection during the vehicle travel. For vehicles with a diesel engine, since the minimum fuel injection rate during the vehicle travel takes a zero value obtained when the accelerator pedal is released, the previously set value Fo is set to a value very close to zero. The previously set value Fo here is set to a value unequal to zero, because, even if an actual fuel injection rate is equal to zero, the fuel flow sensor 14, 19 may often indicate a value other than zero. For vehicles with a gasoline engine, since fuel is injected at a definite rate even by reducing a stepping pressure of the accelerator pedal during the vehicle travel, the previously set value Fo is set to a value close to such a fuel injection rate.

If judgment results in step S52 are positive, that is, if the fuel flow rate F is less than the previously set value Fo associated with the minimum injection during the vehicle travel, the CPU 3 executes step S54 to read the accelerator angle A that the accelerator angle sensor 13, 18 has detected, and then executes step S56 to judge whether the accelerator angle A is approximately zero. Since the angle A is approximately zero this angle is set to zero or to a value close to zero with an instrumental error and other factors taken into account.

When it is judged in this way that the fuel flow rate F is essentially less than the previously set value Fo associated with the minimum injection during the vehicle travel and that the accelerator angle A is approximately zero, the vehicle is judged to be in a zero accelerator angle state and adoption of the above conditions as judgment criteria allows very accurate detection of a minimum fuel injection run of a vehicle powered by a diesel engine or by a gasoline engine. The zero accelerator angle state may be judgeable only from either the fuel flow rate F or the accelerator angle A. The minimum fuel injection run of the vehicle can likewise be detected very accurately by using this method.

If judgment results in step S56 are positive, that is, if the accelerator angle A is approximately zero, a usage state of the auxiliary brake is, in step S58, detected from an operational state of the auxiliary brake actuator 15, 20, and whether the auxiliary brake is being used is judged in step S60. If judgment results in step S60 are positive, that is, if the auxiliary brake is not being used, the CPU 3 proceeds to step S62 to read the vehicle speed S that the vehicle speed sensor 11, 16 has detected. Next, the CPU 3 proceeds to step S64 to calculate, from the detected vehicle speed S and a particular elapsed time, a traveling distance L of the vehicle in its zero accelerator angle state and without the auxiliary brake being used. The CPU 3 further proceeds to step S66 to add the traveling distance L to the memory 4 and store a cumulative traveling distance TL.

If the judgment results in step S52 are negative, this indicates that the fuel flow rate F is not equivalent to the minimum injection during the vehicle travel. If the judgment results in step S56 are negative, this indicates that the accelerator angle A is approximately not zero. If the judgment results in step S60 are negative, this indicates that the auxiliary brake is being used. If any one of the above cases occurs or if the cumulative traveling distance TL is stored into the memory 4 in step S66, the CPU 3 judges in step S68 whether the power supply is turned off. Step S50 onward is repeated if judgment results in step S68 are negative. Decelerated operation monitoring is terminated if the judgment results in step S68 are positive.

Figure 23:
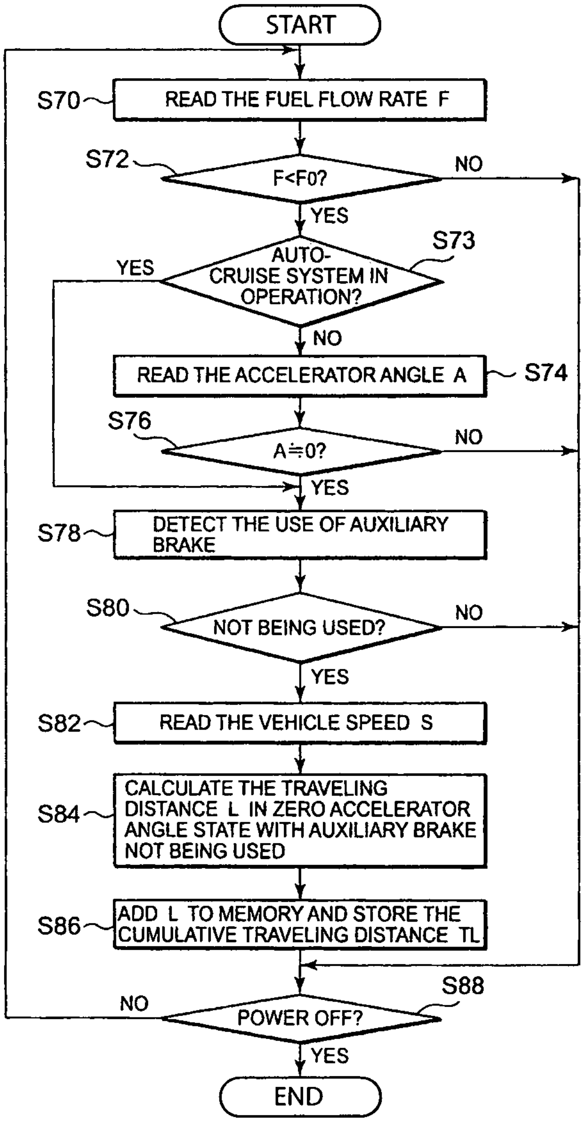
FIG. 23 is a flowchart that shows decelerated drive monitoring different from that of FIG. 22.

If the vehicle has an auto-cruise system capable of adjusting the vehicle speed to the required value automatically, the CPU executes decelerated operation monitoring shown in FIG. 23. Steps S70 and S72 in FIG. 23 are essentially the same as steps S50 and S52 of FIG. 22. If positive results are obtained during the judgment in step S72 as to whether the fuel flow rate F is less than the previously set value Fo associated with the minimum injection during the vehicle travel, the CPU 3 then executes step S73 to judge whether the auto-cruise system is in operation. If judgment results in step S73 are negative, that is, if the auto-cruise system is not in operation, the CPU executes steps S74 to S88 to implement processing that is essentially the same as in steps S54 to S68 of FIG. 22.

If the judgment results in step S73 are positive, that is, if the auto-cruise system is in operation, the CPU skips step S74 of reading the accelerator angle A and step S76 of judging whether the accelerator angle A is approximately zero. Instead, the CPU executes auxiliary-brake usage state detection step S78 and onward. In this manner, during the operation of the auto-cruise system, when the fuel flow rate F is less than the previously set value Fo, the vehicle is judged to be in a zero accelerator angle state. This is due to the fact that since the driver does not operate the accelerator pedal during auto-cruise system operation, it is difficult to judge the zero accelerator angle state from the accelerator angle A.

Decelerated operation monitoring by this fuel-saving management system allows appropriate monitoring of the decelerated operation that uses an engine brake particularly in a vehicle having the auxiliary brake. Consequently, data analyses on fuel-saving operation can be supplied to the driver and the vehicle travel supervisor in optimal form and fuel efficiency improvement can be remarkably raised in accuracy.

The driver and the vehicle travel supervisor can, as shown in FIG. 5, output the cumulative traveling distance TL stored within the memory 4, from the printer 6 on the vehicle as a traveling ratio 81 relative to a total cumulative traveling distance. For example, during driving, the stop of the vehicle, or the return thereof to the vehicle base, therefore, the driver and the vehicle travel supervisor can immediately know the particular driving state by contrasting this state with an immediately previous actual running state. The driver's and other persons' awareness of importance of fuel efficiency improvement can thus be further enhanced.

In addition, if the cumulative traveling distance TL stored within the memory 4 is input to the vehicle owner/user company's data analyzer 32 at the user/owner company, manufacturer, or the like of the vehicle via the memory card 31, the distance TL can be analyzed in further detail in combination with the various reports output from the data analyzer 32. Meanwhile, the fuel flow rate F, accelerator angle A, auxiliary brake usage state information, and vehicle speed S stored within the memory 4 of the main unit 2 of the vehicle-mounted analyzer 1 can also be input to the vehicle owner/ user company's data analyzer 32 via the memory card 31. Additionally, the successive processing shown in FIG. 22 or 23 can be implemented using the vehicle owner/user company's data analyzer 32.

While it has been described that in this fuel-saving management system, the vehicle speed S, the engine speed E, the accelerator angle A, the fuel flow rate F, and information on the use of the auxiliary brake are detected as information on the running state of the vehicle, the present invention is not limited by the description and the fuel-saving management system may be adapted to detect other information on the vehicle, generate warnings based on detected information items, and store the occurrence of overlimit events and the like into the memory 4. In addition, the information processed by the CPU 3 does not always include the accelerator angle A or the accelerator angle change dA, and storing the occurrence of warnings, overlimit events, or the like into the memory 4 by splitting the processed information into processed general-road information and processed highway/expressway information is not required, either.

The kinds of general-road information and highway/expressway information processed are not always limited to the above. The selection and setting of whether the warning based on the setter 21 is to be generated do not necessarily require execution, either.

While it has been described that in this fuel-saving management system, the vehicle speed S, the engine speed E, the accelerator angle A, the fuel flow rate F, and information on the use of the auxiliary brake are detected as information on the running state of the vehicle, the present invention is not limited by the description and the fuel-saving management system may be adapted to detect other information on the vehicle and output processed and detected information, information on the occurrence of warnings and overlimit events, and other information, from the vehicle-mounted printer. In addition, the required warning conditions and required time that were set and/or modified using the setter do not always need to be output from the vehicle-mounted printer.

It is not always necessary to execute output of the fuel consumption rate from the vehicle-mounted printer or to display a warning mark indicating that the overlimit event occurrence rate has exceeded a required value. Furthermore, the information-erasing and/or erasure-starting operations using the travel starting switch and/or the printing switch do not always need to be performed, either.

While it has been described that during decelerated operation monitoring, the zero accelerator angle state indicates that the fuel flow rate F has decreased below the previously set value Fo and that the accelerator angle A has become approximately zero, the present invention is not limited by the description and the zero accelerator angle state may be set on the basis of other information of the vehicle. In addition, although it has been described that the traveling distance L detected when the fuel flow rate F is less than the previously set value Fo associated with the minimum injection during the vehicle travel and when the auxiliary brake is not being used is calculated from the vehicle speed S and elapsed time at that time, the present invention is not limited by this calculation method and the distance L may be calculated from other information on the vehicle.

Additionally, although it has been described that the overlimit data compilation report 71 by the vehicle-mounted printer 6 is used to display the traveling ratio 81 of the cumulative traveling distance TL at zero accelerator angle A and without the auxiliary brake being used, with respect to the total cumulative traveling distance, the present invention is not limited by this display method and the cumulative traveling distance TL may be directly displayed or such a display may not need to be made.

INDUSTRIAL APPLICABILITY

The fuel-saving management system of the present invention allows fuel-saving management and associated assistance to the driver to be conducted very smoothly. More specifically, the driver's mental burden against a warning can be relieved. Also, the settings of required warning conditions relating to the vehicle speed and other predetermined warning values stored in the vehicle-mounted analyzer can be modified rapidly and easily. In addition, the driver and the vehicle travel supervisor can immediately and accurately know the driving state of the vehicle at a particular time thereon, and the driver's awareness of the importance of fuel saving can be further improved. Furthermore, a succession of fuel-saving management activities up to analysis can be performed, even with the vehicle-mounted analyzer alone, and even small-scale enterprises can introduce this system into respective business establishments even more easily. Besides, decelerated operation using an engine brake, especially in a vehicle having an auxiliary brake, can be monitored appropriately and fuel efficiency management can be remarkably improved in accuracy.

The kind of motor vehicle on which the fuel-saving management system of the present invention is to be mounted is not limited to trucks or buses and the fuel-saving management system of the invention can be commonly used for various kinds of vehicles.

The invention claimed is:

1. A fuel-saving management system comprising, on a motor vehicle:

information detectors for detecting, respectively, vehicle speed, engine speed, and a fuel flow rate as information on a running state of the vehicle;

an information-processing device for processing the information detected by the information detectors, the information-processing device also generating a warning to a driver when the vehicle speed, the engine speed and the fuel flow rate satisfy required warning conditions; and an information storage device storing occurrence values;

wherein the required warning conditions are satisfied by the detected engine speed exceeding a previously-set engine speed warning value, the detected vehicle speed not exceeding a previously set vehicle speed value, and the detected fuel flow rate exceeding a previously set fuel flow rate value;

wherein the information-processing device stores an occurrence value into the information storage device only if the required warning conditions are satisfied for a duration that exceeds a previously set duration value.

2. A fuel-saving management system comprising, on a motor vehicle:

information detectors for detecting, respectively, vehicle speed and an accelerator angle;

an information-processing device for processing the information detected by the information detectors, the information-processing device also generating a warning to a driver when the vehicle speed and the accelerator angle satisfy required warning conditions; and an information storage device storing occurrence values;

wherein the required warning conditions are satisfied by the vehicle speed exceeding a previously set vehicle speed warning value and a previously set vehicle speed value, and the accelerator angle exceeding a previously set accelerator angle value;

wherein the information-processing device stores an occurrence value into the information storage device only if the required warning conditions are satisfied for a duration that exceeds a previously set duration value.

* * * * *